(12) United States Patent
Zhang

(10) Patent No.: US 12,436,160 B2
(45) Date of Patent: Oct. 7, 2025

(54) METHOD OF DETECTING AN OBSTRUCTION IN A FLUID ANALYZER

(71) Applicant: Siemens Healthcare Diagnostics Inc., Tarrytown, NY (US)

(72) Inventor: Wei Zhang, Needham, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 19/103,927

(22) PCT Filed: Aug. 15, 2023

(86) PCT No.: PCT/US2023/072211
§ 371 (c)(1),
(2) Date: Feb. 14, 2025

(87) PCT Pub. No.: WO2024/040052
PCT Pub. Date: Feb. 22, 2024

(65) Prior Publication Data
US 2025/0258187 A1  Aug. 14, 2025

Related U.S. Application Data

(60) Provisional application No. 63/371,943, filed on Aug. 19, 2022.

(51) Int. Cl.
*G01N 35/00* (2006.01)
*G01N 35/10* (2006.01)

(52) U.S. Cl.
CPC . *G01N 35/00613* (2013.01); *G01N 35/00693* (2013.01); *G01N 35/1004* (2013.01); *G01N 35/1016* (2013.01)

(58) Field of Classification Search
CPC ....... G01N 35/00613; G01N 35/00693; G01N 35/1004; G01N 35/1016
See application file for complete search history.

(56) References Cited

U.S. PATENT DOCUMENTS 3,896,020 A   7/1975  Le Blanc, Jr.
4,696,183 A   9/1987  Mitsumaki et al.
(Continued)

FOREIGN PATENT DOCUMENTS

CN   10168872 A    3/2010
CN   102652258 A   8/2012
(Continued)

OTHER PUBLICATIONS

International Search Report and Written Opinion of International Application No. PCT/US2023/072211 mailed on Dec. 13, 2023.
(Continued)

*Primary Examiner* — John McGuirk

(57) ABSTRACT

Methods and systems for detecting an obstruction on a sensor of a fluid analyzer, including a method comprising causing a first calibration fluid to contact the sensor to generate signals indicative of a first electric potential of the first calibration fluid; causing a second calibration fluid to contact the sensor to generate signals indicative of a second electric potential of the second calibration fluid; storing a first response slope; causing the first calibration fluid to contact the sensor to generate signals indicative of a third electric potential of the first calibration fluid; causing the second calibration fluid to contact the sensor to generate signals indicative of a fourth electric potential of the second calibration fluid; storing a second response slope; and storing data indicative of an obstruction on the sensor in response to a difference between the first response slope and the second response slope being beyond a threshold.

24 Claims, 9 Drawing Sheets

(56) References Cited

U.S. PATENT DOCUMENTS

| | | | |
|---|---|---|---|
| 4,818,361 A | 4/1989 | Burgess et al. | |
| 5,112,455 A | 5/1992 | Cozzette et al. | |
| 5,312,528 A | 5/1994 | Hoogendijk | |
| 5,554,272 A | 9/1996 | Benco et al. | |
| 6,022,747 A | 2/2000 | Gherson et al. | |
| 7,022,219 B2 | 4/2006 | Mansouri et al. | |
| 7,338,802 B2 | 3/2008 | Frischauf et al. | |
| 7,867,375 B2 | 1/2011 | Kaltenbeck et al. | |
| 7,949,473 B2 | 5/2011 | Rauh | |
| 8,103,456 B2 | 1/2012 | Doniger et al. | |
| 8,128,801 B2 | 3/2012 | Mansouri et al. | |
| 8,346,335 B2 | 1/2013 | Harper et al. | |
| 8,428,679 B2 | 4/2013 | Goode, Jr. et al. | |
| 8,473,220 B2 | 6/2013 | Doniger et al. | |
| 8,497,130 B2 | 7/2013 | Raguse et al. | |
| 8,626,257 B2 | 1/2014 | Li et al. | |
| 8,657,747 B2 | 2/2014 | Kamath et al. | |
| 8,672,845 B2 | 3/2014 | Kamath et al. | |
| 8,676,513 B2 | 3/2014 | Doniger et al. | |
| 8,721,852 B2 | 5/2014 | Mansouri et al. | |
| 8,801,918 B2 | 8/2014 | Qin et al. | |
| 8,869,585 B2 | 10/2014 | Troughton et al. | |
| 9,066,709 B2 | 6/2015 | Doniger et al. | |
| 9,188,525 B2 | 11/2015 | Iyengar et al. | |
| 9,222,951 B2 | 12/2015 | Schmitt et al. | |
| 9,572,524 B2 | 2/2017 | Iyengar et al. | |
| 9,730,623 B2 | 8/2017 | Harper et al. | |
| 9,903,830 B2 | 2/2018 | Malecha et al. | |
| 10,413,228 B2 | 9/2019 | Iyengar et al. | |
| 10,463,288 B2 | 11/2019 | Harper et al. | |
| 10,470,660 B2 | 11/2019 | Garcia et al. | |
| 11,000,215 B1 | 5/2021 | Simpson et al. | |
| 11,020,031 B1 | 6/2021 | Simpson et al. | |
| 11,169,141 B2 | 11/2021 | Taagaard et al. | |
| 11,226,328 B2 | 1/2022 | Frischauf et al. | |
| 11,293,889 B2 | 4/2022 | Li et al. | |
| 2004/0132193 A1 | 7/2004 | Frischauf et al. | |
| 2006/0042964 A1* | 3/2006 | Mansouri | G01N 33/492 73/1.02 |
| 2006/0149161 A1 | 7/2006 | Wilson et al. | |
| 2009/0075386 A1 | 3/2009 | Dunfee et al. | |
| 2015/0122712 A1 | 5/2015 | Brandl et al. | |
| 2018/0284049 A1 | 10/2018 | Zhang et al. | |
| 2018/0372719 A1 | 12/2018 | Frischauf et al. | |
| 2019/0011429 A1* | 1/2019 | Taagaard | G01N 33/492 |
| 2022/0120774 A1 | 4/2022 | Fujita et al. | |

FOREIGN PATENT DOCUMENTS

| | | |
|---|---|---|
| CN | 105378451 A | 3/2016 |
| CN | 112444623 A | 3/2021 |
| CN | 212779470 U | 3/2021 |
| CN | 114624295 A | 6/2022 |
| JP | S5444593 A | 4/1979 |
| JP | H02159548 A | 6/1990 |
| JP | H0580017 A | 3/1993 |
| JP | 2005524463 A | 8/2005 |
| WO | 2011070719 A1 | 6/2011 |
| WO | 2017108647 A1 | 6/2017 |

OTHER PUBLICATIONS

D'Orazio; "Effects of Blood Clots an Measurements of pH and Blood Gases in Critical Care Analyzers"; Point of Care vol. 10; No. 4; Dec. 1, 2011; pp. 186-188.

* cited by examiner

METHOD OF DETECTING AN OBSTRUCTION IN A FLUID ANALYZER

CROSS-REFERENCE TO RELATED APPLICATION(S)

This application claims benefit under 35 USC § 119 (e) of U.S. Provisional Application No. 63/371,943, filed Aug. 19, 2022. The entire contents of the above-referenced patent application are hereby expressly incorporated herein by reference.

BACKGROUND

In a variety of instances, it is desirable to measure the constituents in a bodily fluid including, for example, partial pressure of blood gasses in a whole blood sample, concentrations of electrolytes in the blood sample, and the hematocrit value of the blood sample. For example, measuring $pCO_2$, $pO_2$, pH, $Na^+$, $K^+$, $Ca^{2+}$ and hematocrit value are primary clinical indications in assessing the condition of a medical patient. In addition, in an attempt to use as little of the patient's blood as possible in each analysis performed, the devices which are employed to analyze a blood sample are preferably relatively small. Performing blood analysis using a small blood sample is important, for example, when a relatively large number of samples must be taken in a relatively short amount of time or if the volume of blood is limited, as in neonates.

For example, patients in intensive care may require a sampling frequency of 15-20 per day for blood gas and clinical chemistry measurements, leading to a potentially large loss of blood during patient assessment. In addition, by reducing the size of the analyzer sufficiently to make the unit portable, analysis can be performed at the point of care. Also, reduced size typically means reduced turnaround time. Furthermore, in order to limit the number of tests which must be performed it is desirable to gather as much information as possible upon completion of each test. However, size limitations are imposed upon the sensors that are used to measure blood chemistry. These size limitations are in large part due to physical geometries of the sensors and the connections to the sensors.

Point of care blood gas analyzers permit in vitro analysis at the patient's bedside, in the emergency room, or in the intensive care unit. These units use solid state sensors with thin-film electrodes. The microchips, reagents, calibrators, and a sampling device are all contained within a disposable cartridge system. Healthcare facilities can select cartridges with additional test options, including potassium, glucose, BUN, and lactate. Because whole blood can be tested, minimal specimen processing is needed; the sample does not have to be centrifuged and the plasma separated from the red blood cells prior to testing.

In settings with medium-to high volume sample testing, a multi-use cartridge system is used. These cartridges can be customized to the specific analyte menu and to the volume of testing. The number of samples measured on a cartridge may vary from 25 to 750 and once loaded into the analyzer, the cartridge typically has an in-use life of between 14 and 30 days.

The basic principle of operation for blood gas analyzers has not changed significantly from earlier units. In about 2005, self-contained cartridges were introduced into several analytical systems, paving the way for point of care testing and compact units. Whole blood can be analyzed for many analytes, including the electrolytes potassium ($K^+$), sodium ($Na^+$), and calcium ($Ca^{2+}$) and metabolites such as glucose, lactate, blood urea nitrogen (BUN), and creatine. The sensors used for these measurements are ion-specific or ion-selective electrodes (ISE). These sensors are membrane-based electrochemical transducers that respond to a specific ion. Biosensors are used in analyzers in the traditional clinical laboratory, but also in point-of-care testing devices. Biosensors convert the biochemical signal into an electrical signal.

Electrolytes are determined by potentiometric measurements, a form of electrochemical analysis. In potentiometry, the potential or voltage is measured between the two electrodes in a solution. These potentials can also be produced when a metal and ions of that metal are present in a solution. By using a membrane that is semipermeable to the ion, different concentrations of the ion can be separated. These systems use a reference and a measuring electrode. A constant voltage is applied to the reference electrode; the difference in voltage between the reference and measuring electrode is used to calculate the concentration of the ion in solution.

Ion-selective electrodes are based on a modification of the principle of potentiometry. The potential difference or electron flow is created by selectively transferring the ion to be measured from the sample solution to the membrane phase. The ion-selective electrode measures the free ion concentration of the desired analyte on a selectively produced membrane. Membranes have a complex composition and contain organic solvents, inert polymers, plasticizers, and ionophores wherein the ionophores are molecules that increase the membrane's permselectivity to the specific ion.

Amperometric methods measure the current flow produced from oxidation-reduction reactions. Types of amperometry include enzyme electrodes, such as the glucose oxidase method and the Clark $pO_2$ electrode. These types of designs are well known as biosensors and are adaptable for testing in the clinical laboratory as well as for point of care testing. Enzyme-based biosensor technology was first developed to measure blood glucose. A solution of glucose oxidase is placed between the gas permeable membrane of the $pO_2$ electrode and an outer membrane that is semipermeable. Glucose in the blood diffuses through the semipermeable membrane and reacts with the glucose oxidase. Glucose is converted by glucose oxidase to hydrogen peroxide and gluconic acid.

A polarizing voltage is applied to the electrode, which oxidizes the hydrogen peroxide and contributes to the loss of electrons. Oxygen is consumed near the surface of the pO2 electrode, and its rate of consumption is measured. The loss of electrons and rate of decrease of pO2 is directly proportional to the glucose concentration in the sample. Enzyme-based biosensors are also used to measure cholesterol, creatine, and pyruvate.

The basic principles of operation for laboratory blood gas analyzers are the same as for the previously described electrodes for pH, pCO2, and pO2; and ion specific electrodes for the measurement of electrolytes. Approximately 50-120 µl of a well-mixed arterial blood sample are typically injected through the inlet and sample probe into the measuring chamber. The specimen then contacts the surface of each electrode for several seconds.

One of the principal challenges with existing fluid analyzers is detecting and removing obstructions including, for example, blood clots. The presence of obstructions may block the pathway of the fluid analyzer, produce up time for the fluid analyzer, and impact individual sensor response resulting in, for example, the presentation of biased results regarding critical blood gas parameters (e.g., pH and/or $pCO_2$). Obstructions are typically formed in the process of preparing a sample for analysis. However, even where preanalytical procedures are performed with the utmost care, small obstructions may appear in the fluid (or measurement) channel.

Accordingly, it would be desirable to provide a fluid analyzer that is capable of detecting the presence (or absence) of an obstruction without the need for an additional sensor, removing the obstruction via fluid aspiration and drainage, and/or alerting a user to the presence (or absence) of an obstruction and the questionability of a result.

SUMMARY

The problems of detecting the presence (or absence) of an obstruction on a fluid analyzer without the need for an additional sensor, removing the obstruction via fluid aspiration and drainage, and/or alerting a user to the presence (or absence) of an obstruction and the questionability of a result are solved with the methods and systems disclosed herein.

Consistent with an aspect of the present disclosure, an exemplary fluid analyzer may comprise: a fluid channel operable to carry fluids; a sensor in fluidic communication with the fluid channel; a meter operable to receive signals generated by the sensor and transform the signals into information indicative of an electric potential of the fluids; a first calibration fluid having a first analyte concentration; a second calibration fluid having a second analyte concentration different from the first analyte concentration; one or more calibration fluid injection port in fluidic communication with the fluid channel, the one or more calibration fluid injection port being operable to receive a first calibration fluid and a second calibration fluid; one or more valve positioned between the one or more calibration fluid injection port and the sensor, the one or more valve being openable and closeable to provide one or more sample of each of the first calibration fluid and the second calibration fluid to the fluid channel; and a control system having a processor operable to execute processor-executable code that when executed by the processor causes the processor to run an obstruction detection algorithm comprising: at a first time period, controlling the one or more valve to successively pass the first calibration fluid and the second calibration fluid through the fluid channel to the sensor, and storing first data indicative of a first response slope based at least in part on a first difference between first information generated by the meter indicative of a first electric potential generated by the sensor contacting the first calibration fluid and second information indicative of a second electric potential generated by the sensor contacting the second calibration fluid; at a second time period after the first time period, controlling the one or more valve to successively pass the first calibration fluid and the second calibration fluid through the fluid channel to the sensor, and storing second data indicative of a second response slope based at least in part on a second difference between third information indicative of a third electric potential generated by the sensor contacting the first calibration fluid and fourth information generated by the meter indicative of a fourth electric potential generated by the sensor contacting the second calibration fluid; and storing third data indicative of an obstruction on the sensor in response to a difference between the first response slope and the second response slope being beyond (i.e., above or below) a threshold. In some embodiments, the third data is stored when the difference is above a threshold. In other embodiments, the difference and the threshold can be inverted. In this embodiment, the third data is stored when the difference is below the threshold.

Consistent with another aspect of the present disclosure, an exemplary method of detecting an obstruction on a sensor of a fluid analyzer may comprise: at a first time period, successively causing flow of a first calibration fluid and a second calibration fluid having known analyte concentrations to the sensor and determining a first response sensitivity of the sensor based at least in part on the known analyte concentrations and the sensor responses of the sensor to the first calibration fluid and the second calibration fluid; at a second time period, successively causing flow of the first calibration fluid and the second calibration fluid to the sensor and determining a second response sensitivity of the sensor based at least in part on the known analyte concentrations and the sensor responses of the sensor to the first calibration fluid and the second calibration fluid; and determining, by a processor, presence of the obstruction on the sensor based on at least in part on a difference between the first response sensitivity and the second response sensitivity.

Consistent with another aspect of the present disclosure, an exemplary fluid analyzer may comprise: a sensor configured to measure at least one parameter associated with a fluid; one or more container configured to store a first calibration fluid and a second calibration fluid having known analyte concentrations; one or more channel configured to provide fluid communication among the sensor and the one or more container; and a processor configured to determine presence of an obstruction obstructing the sensor, wherein the processor is configured to: at a first time period, successively cause flow of the first calibration fluid and the second calibration fluid to the sensor and determine a first response sensitivity of the sensor based on at least in part on the known analyte concentrations and the sensor responses of the sensor to the first calibration fluid and the second calibration fluid; at a second time period, successively cause flow of the first calibration fluid and the second calibration fluid to the sensor and determine a second response sensitivity of the sensor based at least in part on the known analyte concentrations and sensor responses of the sensor to the first calibration fluid and the second calibration fluid; and determine the presence of the obstruction based on at least in part on a difference between the first response sensitivity and the second response sensitivity.

Consistent with another aspect of the present disclosure, an exemplary non-transitory computer readable medium may store an exemplary obstruction detection algorithm comprising processor-executable code that when executed by a processor causes the processor to: at a first time period, control one or more valve to successively pass a first calibration fluid and a second calibration fluid through a fluid channel to a sensor, and store first data indicative of a first response slope based at least in part on a first difference between first information generated by a meter indicative of a first electric potential generated by the sensor contacting the first calibration fluid and second information generated by the meter indicative of a second electric potential generated by the sensor contacting the second calibration fluid; at a second time period after the first time period, control the one or more valve to successively pass the first calibration fluid and the second calibration fluid through the fluid channel to the sensor, and store second data indicative of a second response slope based at least in part on a second difference between third information generated by the meter indicative of a third electric potential generated by the sensor contacting the first calibration fluid and fourth information generated by the meter indicative of a fourth electric potential generated by the sensor contacting the second calibration fluid; and store third data indicative of an obstruction on the sensor in response to a difference between the first response slope and the second response slope being beyond (i.e., above or below) a threshold. In some embodiments, the third data is stored when the difference is above a threshold. In other embodiments, the difference and the threshold can be inverted. In this embodiment, the third data is stored when the difference is below the threshold.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
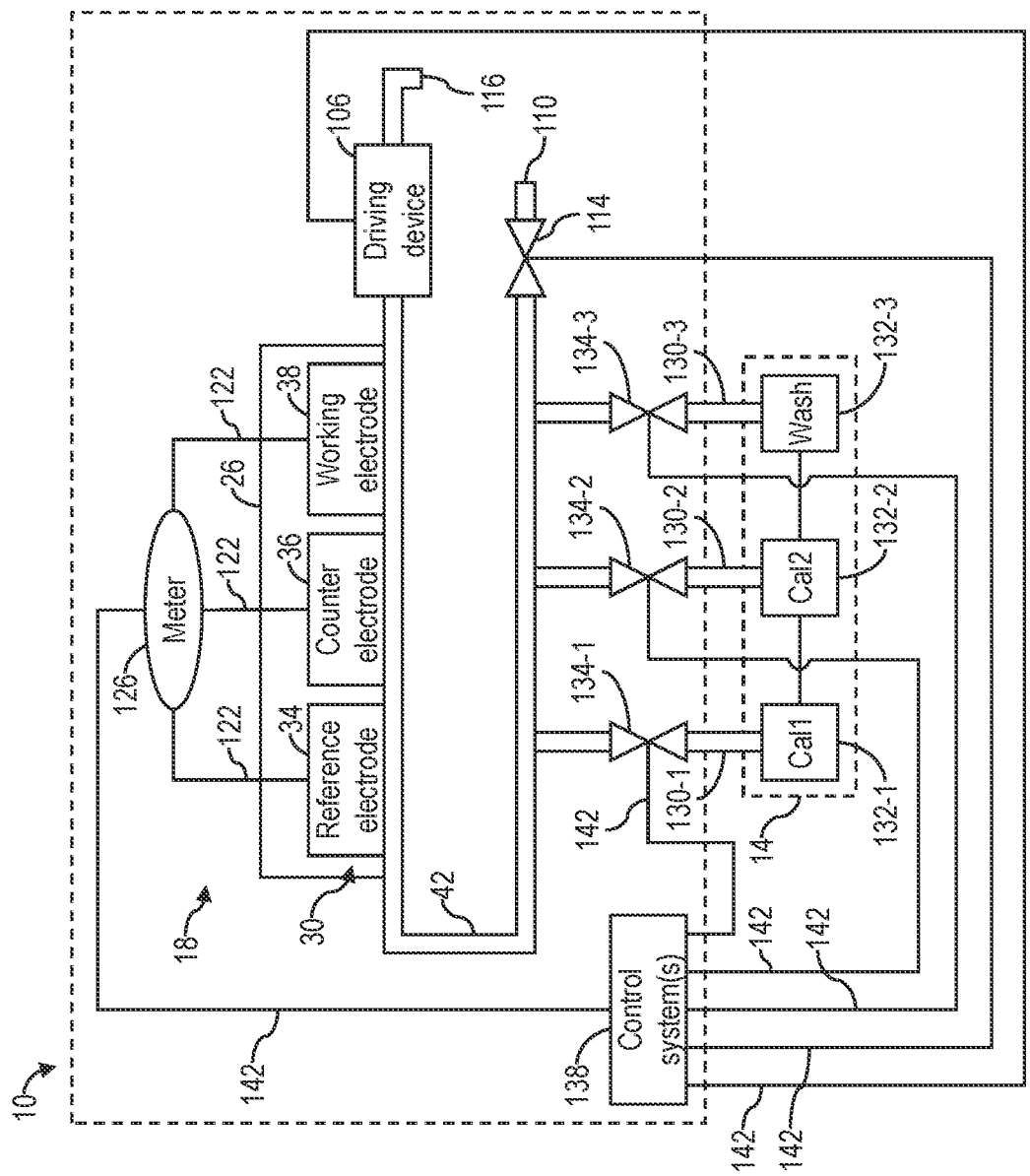
FIG. 1 is a schematic diagram of an exemplary embodiment of a fluid analyzer constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements. Unless otherwise defined herein, scientific and technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular. The nomenclatures utilized in connection with, and the laboratory procedures and techniques of, analytical chemistry, synthetic organic chemistry, and medicinal and pharmaceutical chemistry described herein are those well-known and commonly used in the art.

All patents, published patent applications, and non-patent publications mentioned in the specification are indicative of the level of skill of those skilled in the art to which this presently disclosed and/or claimed inventive concept(s) pertains. All patents, published patent applications, and non-patent publications referenced in any portion of this application are herein expressly incorporated by reference in their entirety to the same extent as if each individual patent or publication were specifically and individually indicated to be incorporated by reference.

All of the non-transitory computer readable mediums, control systems, fluid analyzers and/or methods disclosed and/or claimed herein can be made and executed without undue experimentation in light of the present disclosure. While the fluid analyzer and methods of this presently disclosed and/or claimed inventive concept(s) have been described in terms of preferred embodiments, it will be apparent to those of skill in the art that variations may be applied to the fluid analyzers and/or methods and in the steps or in the sequence of steps of the method described herein without departing from the concept, spirit, and scope of the presently disclosed and/or claimed inventive concept(s). All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The singular forms "a," "an," and "the" include plural referents unless the context clearly indicates otherwise. Thus, for example, reference to "a compound" may refer to 1 or more, 2 or more, 3 or more, 4 or more, or greater numbers of compounds. The term "plurality" refers to "two or more." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by +20%, or +10%, or +5%, or +1%, or +0.1% from the specified value, as such variations are appropriate to perform the disclosed methods and as understood by persons having ordinary skill in the art. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z. The use of ordinal number terminology (i.e., "first", "second", "third", "fourth", etc.) is solely for the purpose of differentiating between two or more items and is not meant to imply any sequence or order or importance to one item over another or any order of addition, for example.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise.

Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

The term "sample" as used herein will be understood to include any type of biological sample or non-biologic sample that may be utilized in accordance with the presently disclosed and/or claimed inventive concept(s). That is, the sample may be any fluidic sample and/or sample capable of being fluidic (e.g., a biological sample mixed with a fluidic substrate). Examples of biological samples that may be utilized include, but are not limited to, whole blood or any portion thereof (i.e., plasma or serum), saliva, sputum, cerebrospinal fluid (CSF), surgical drain fluid, skin, interstitial fluid, tears, mucus, urine, swabs, combinations, and the like. Examples of non-biologic samples include wastewater, industrial fluids, and the like. It should be noted that although the present disclosure describes the use of the fluid analyzer to analyze a biological sample, one skilled in the art will appreciate that the concepts disclosed herein may be applied to any sample wherein a concentration of analyte may be determined, and as such, the present disclosure is not limited to biological samples. Exemplary target analytes include, but are not limited to oxygen, or a metabolite including but not limited to glucose, lactate, creatinine, or the like.

The term "fluid" as used herein refers to a liquid or gas that can be passed through at least a portion of the fluid analyzer and analyzed by components of the fluid analyzer. The fluid may be a sample, a calibration reagent (e.g., fluid or gas), a wash fluid, or a quality control fluid.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like.

Software may include one or more computer readable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

It is to be further understood that, as used herein, the term "user" is not limited to a human being, and may comprise, a computer, a server, a website, a processor, a network interface, a human, a user terminal, a virtual computer, combinations thereof, and the like, for example.

The term "calibration parameters" as used herein refers to a collection of data points or one or more functions used to derive a collection of data points that correlates the signals from the sensor to known analyte concentrations. The calibration parameters can be derived by a calibration algorithm, such as a linear algorithm, a spline-based algorithm, exponential algorithm, a least squares algorithm, a logarithmic algorithm, or the like that is configured to fit a function to at least two calibration points.

The term "calibration logic" as used herein refers to the program logic used by a processor within a control system to interpret data measured by one or more electrodes. In particular, the term "calibration logic" is the program logic of a control system used by a processor to interpret data from an electrochemical sensor having at least a working electrode and a reference electrode.

Electrochemical sensors are widely used in in vitro diagnostic instruments. These electrochemical sensors include electrodes, which are fabricated from metals, from metal inks by screen-printing (thick film method) or from chemical vapor deposition of metal film (thin film method), generally require calibration. The calibration corrects the sensor-to-sensor variations in electrode size and surface area, change in chemical and biochemical activities during use life, electrical signal drift, etc. The oxygen sensor used in the Siemens Healthcare Point of Care (POC) RAPIDPoint 500 Blood Gas Analyzer, for example, has a screen-printed platinum working electrode, a silver/silver chloride reference electrode, and a gold counter electrode.

Referring now to the Figures, and in particular to FIG. 1, shown therein is an illustration of an exemplary embodiment of a fluid analyzer 10 in combination with a calibration cartridge 14 and one or more electrochemical sensor 18 (hereinafter "electrochemical sensors 18"). The electrochemical sensors 18 can be implemented in the form of a cartridge that is connected to the fluid analyzer 10, for example, in the manner shown in FIG. 1. The fluid analyzer 10 may include a housing 26 supporting and/or encompassing at least a portion of each of the electrochemical sensors 18.

This disclosure describes an obstruction detection algorithm for determining if any of the electrochemical sensors 18 is being affected by an obstruction. In one embodiment, the presently disclosed methodology is a novel way of detecting the absence or presence of an obstruction on or near at least one of the electrochemical sensors 18 without using an additional sensor. The presence of a blood clot or another obstruction on or near an individual one of the electrochemical sensors 18 may change a local electrolyte environment (i.e., electrolyte diffusion kinetics, buffer capacity, carryover contamination, and/or sample dilution) or a local analyte concentration around the respective one of the electrochemical sensors 18, which may significantly affect response sensitivity (i.e., slope), kinetics, and result accuracy.

The presently disclosed methodology uses a relative slope variation (i.e., comparing a current response slope with the response slope of an adjacent prior timepoint) at an individual sensor(s) to determine whether the individual sensor (s) of the electrochemical sensors 18 is affected by an obstruction. When the relative slope variation presents a sudden drop over a predetermined threshold (i.e., a threshold determined based on empirical data), this drop is an indication that an obstruction is likely formed on or near the individual sensor(s) of the electrochemical sensors 18. In response to detecting the presence of an obstruction, the fluid analyzer 10 may alert the user to the presence of the obstruction and the questionability of the result and/or perform an obstruction removal process (e.g., fluid aspiration and drainage and/or manual obstruction removal). Alternatively or in addition to detecting the presence of an obstruction, the presently disclosed methodology may detect the absence of an obstruction when the relative slope variation does not drop below the predetermined threshold and, in response, the fluid analyzer 10 may alert the user to the absence of the obstruction.

Response sensitivity of the electrochemical sensors 18 may be calculated based on the response of the electrochemical sensors 18 to calibrators of at least two concentrations (i.e., a two-point calibration). The response slope may be given by the formula (1) below:

$$m = \frac{V_{high} - V_{low}}{\log C_{high} - \log C_{low}} \quad (1)$$

where m is the response slope, $V_{high}$ is the signal response of the electrochemical sensor 18 to the high-concentration calibration reagent, $V_{low}$ is the signal response of the electrochemical sensor 18 to the low-concentration calibration reagent, $C_{high}$ is the concentration of the high-concentration calibration reagent, and $C_{low}$ is the concentration of the low-concentration calibration reagent. The signal responses $V_{high}$ and $V_{low}$ are electrical signal responses which may be voltage signal responses or current signal responses. The signal responses and the corresponding concentrations of the calibration reagents may be referred to as calibration parameters used to determine the response slope m, which indicates a response sensitivity of an individual sensor for responding to or measuring analyte concentrations. Each of the electrochemical sensors 18 has its own slope specification over its individual use-life.

When manufactured properly, each of the electrochemical sensors 18 has a stable near-Nernstian slope, thereby ensuring sufficient accuracy and consistency of response performance (i.e., response accuracy and precision). However, in the integrated sensor module of the fluid analyzer 10, each individual electrochemical sensor 18 may present evidence of a failure in a number of modes.

First, where the response slope of an electrochemical sensor 18 slowly declines and eventually falls out of the specification range for the electrochemical sensor 18, this slow decline may be evidence of an irregularity concerning the sensing components of the electrochemical sensor 18 (e.g., leaching of ionophore or plasticizers, foreign sensing component migration, and/or component dilution or hydration).

Second, where the response slope of each of the electrochemical sensors 18 simultaneously "moves" higher or lower, this simultaneous movement may be evidence that an obstruction is present on or near a reference electrode, causing the reference electrode to lose stable liquid junction potential. This may cause the electrochemical sensors 18 to return unstable signals in response to both high- and low-concentration calibration reagents.

Third, where the response slope of a particular electrochemical sensor 18 presents a sudden slope movement, e.g., drop of a significant magnitude, the sudden slope movement may be evidence of a foreign substance (i.e., an obstruction) coating or partially coating a sensing component of the electrochemical sensor 18 (e.g., a cover membrane of an ion-selective electrode). Once a foreign substance is present on a portion (e.g., a majority) of the sensing membrane of an electrochemical sensor 18, the local diffusion and concentration environment is temporarily altered, and the foreign substance acts as a layer of "pollution", a "buffer", or a "diffusion reducer". During two-point calibration, the high-concentration calibration reagent is "diluted" by the foreign substance while the low-concentration calibration reagent is also "polluted" by the foreign substance. As a result, the response slope of the electrochemical sensor 18 drops abruptly in response to the presence of a foreign substance. If the foreign substance is relatively small (i.e., a microclot), the foreign substance's presence may not affect the local concentration environment and the impact on slope may be negligibly small, allowing these electrochemical sensors 18 to operate relatively normally.

The obstruction detection algorithm described herein concerns the third failure mode described above. In order to detect an obstruction on or near an electrochemical sensor 18 of a fluid analyzer 10, the presently disclosed methodology compares a current response sensitivity ($m_n$) of the electrochemical sensor 18 with a prior, "normal" response sensitivity ($m_{n-1}$) of the same electrochemical sensor 18. The difference between the two response sensitivities is given by the formula (2):

$$\Delta m = m_n - m_{n-1} \qquad (2)$$

Where no obstruction is present, $\Delta m$ may be close to zero. Through experimentation, a threshold range may be developed with empirical data to include any micro-clots that may not drastically affect sensor response.

After $\Delta m$ exceeds (i.e., is beyond), the threshold range, $m_{n-1}$ is stored as a "normal" response slope to which the response slope of the next adjacent timepoint ($m_n+1$) is compared (i.e., $\Delta m^* = m_{n+x} - m_{n-1}$) for x=1, 2, etc. $\Delta m^*$ continuing to exceed the threshold range is evidence that the obstruction continues to interfere with the electrochemical sensor 18. In some embodiments, $\Delta m$ and the threshold range, $m_{n-1}$ may be inverted. In this case, $\Delta m$ being less than the threshold range, $m_{n-1}$ is evidence that the obstruction continues to interfere with the electrochemical sensor 18. Accordingly, the change in response slope being outside a threshold range (i.e., above and/or below predetermined values) is evidence of an obstruction.

Where a foreign substance is removed from the electrochemical sensor 18, the response slope of the electrochemical sensor 18 may return to normal (i.e., near-zero or within the threshold range, meaning that the sensor signal difference in response to the high-concentration calibration reagent and the low-concentration calibration reagent is relatively consistent).

In some embodiments, the obstruction detection algorithm is applicable to determining whether or not an obstruction exists with respect to each individual electrochemical sensor 18 of a fluid analyzer 10. Where an obstruction migrates from an upstream position on the fluid analyzer 10 to a downstream position on the fluid analyzer 10, such may be observed by tracking a corresponding sequential drop in slope of the electrochemical sensors 18. Where an obstruction migrates from an initial position on a particular electrochemical sensor 18 without any intervention, the particular electrochemical sensor 18 may return to a normal response situation.

Figure 2:
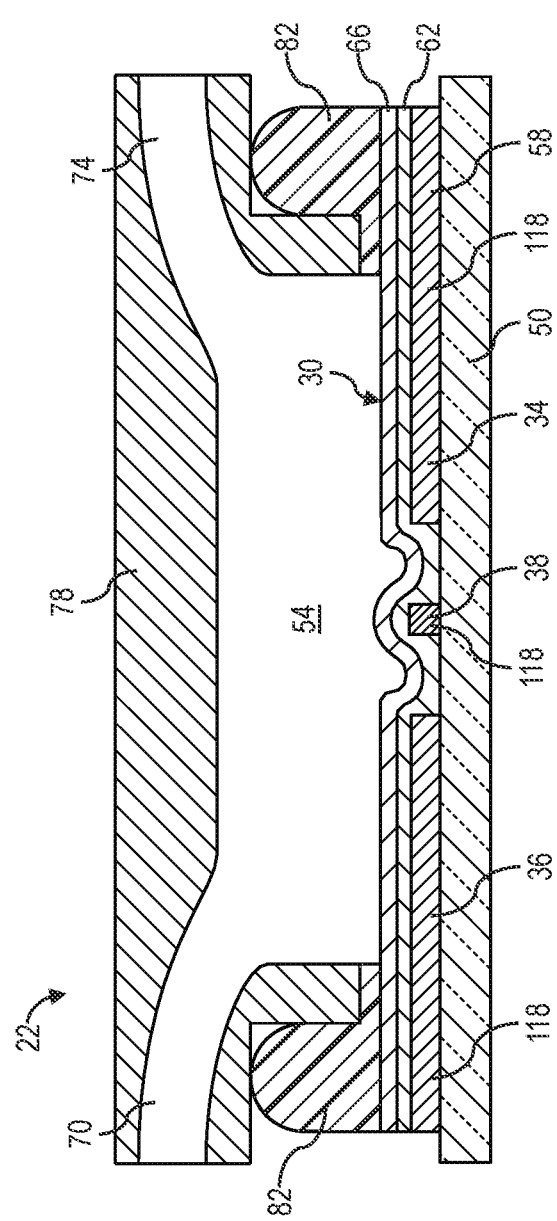
FIG. 2 is a cross-sectional view of an exemplary embodiment of a prior art amperometric sensor that may be read by the fluid analyzer of FIG. 1.

In some embodiments, each of the electrochemical sensors 18 is an amperometric sensor 22 (hereinafter "amperometric sensors 22"). An exemplary amperometric sensor is shown in FIG. 2. The amperometric sensors 22 generally comprise two or more electrodes 30, which are shown by way of example as a reference electrode 34, a counter electrode 36, and a working electrode 38. Although FIG. 1 shows the reference electrode 34 being upstream of the counter electrode 36 and the working electrode 38, in one embodiment, the reference electrode 34 is downstream of the counter electrode 36 and the working electrode 38 (not shown). It should be noted that other sensor arrangements may be used, such as opposing sensor arrays with different electrode arrangements including, for example, co-planar electrode arrangements and/or opposing electrode arrangements.

In some embodiments, the reference electrode 34, the counter electrode 36, and the working electrode 38 of the amperometric sensors 22 are selected so as to be able to produce an electrochemical reaction, i.e., reduction-oxidation (hereinafter "redox"), in the presence of oxygen at a suitable voltage potential. In one embodiment, the reference electrode 34, the counter electrode 36, and the working electrode 38 are selected so as to be able to produce an electrochemical reaction with a target analyte or a reaction byproduct of the target analyte in a sample. In one embodiment, the reference electrode 34 can be constructed of silver/silver chloride, the counter electrode 36 can be constructed of gold, and the working electrode 38 can be constructed of platinum. However, it should be understood that the reference electrode 34, the counter electrode 36, and the working electrode 38 can be constructed of other materials including gold, platinum, silver, and combinations thereof.

In other embodiments, each of the electrochemical sensors 18 is a potentiometric sensor 46 (hereinafter "potentiometric sensors 46") (shown in FIG. 4). The potentiometric sensors 46 generally comprise two or more electrodes 30, which are shown by way of example as the reference electrode 34 and the working electrode 38.

In some embodiments, the reference electrode 34 and the working electrode 38 of the potentiometric sensors 46 are selected so as to be able to produce an electrochemical reaction, i.e., ionic activity, in the presence of a species within a fluid, such as a simple solution, quality control reagent, and/or calibration reagent. In some embodiments, the working electrode 38 is an ion-specific or ion-selective electrode (hereinafter "ISE") for sensing other species including but not limited to chloride ions ($Cl^-$), magnesium ions ($Mg^{2+}$), potassium ions ($K^+$), sodium ions ($Na^+$), hydrogen ions ($H^+$), bicarbonate ions ($HCO_3^-$), calcium ions ($Ca^{2+}$), and/or urea molecules ($CO(NH_2)_2$).

The fluid analyzer 10 may comprise a fluid channel 42, whereby fluids, such as a sample, quality control fluid, wash fluid, and/or calibration reagent, can pass through the fluid channel 42 to come into contact with at least one of the electrochemical sensors 18, including but not limited to the amperometric sensors 22 and/or the potentiometric sensors 46.

Referring now to FIGS. 1 and 2, in one embodiment, each of the amperometric sensors 22 is assembled on a substrate 50 within the housing 26 defining a chamber 54. In this embodiment, the working electrode 38 is positioned between the reference electrode 34 and the counter electrode 36. The amperometric sensor 22 may be provided with a dielectric layer 58. The substrate 50 may be constructed of a dielectric material, such as plastic, ceramic, silicon, etc. The dielectric layer 58 may contain openings for one or more electrode 30 of the amperometric sensor 22 including but not limited to the reference electrode 34, the counter electrode 36, and the working electrode 38. The electrodes 30 of the amperometric sensor 22 may be covered by an electrolyte layer 62 (e.g., Nafion®) and/or a permeable membrane 66 (e.g., a copolymer). A fluid, such as a calibration reagent or a sample, enters the chamber 54 through an entry port 70 and exits the chamber 54 through an exit port 74. The housing 26 may be provided with a cover 78 that encloses the amperometric sensor 22 and a gasket 82 that engages the permeable membrane 66 and the cover 78 to seal the chamber 54, the entry port 70, and the exit port 74.

The fluid may pass through the fluid channel 42 and into the chamber 54 defined by the housing 26 supporting and/or encompassing the amperometric sensors 22 such that the fluid may assist in creating an electrochemical reaction between a target analyte or a reaction byproduct of a target analyte with the amperometric sensor 22.

Figure 3:
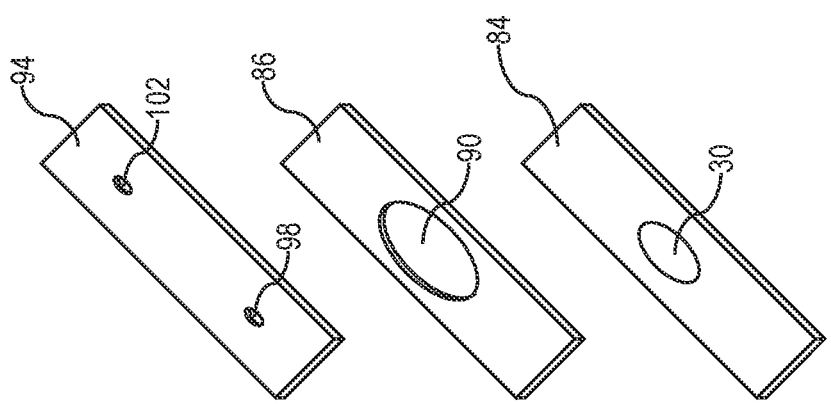
FIG. 3 is an exploded view of another embodiment of a prior art amperometric sensor that may be read by the fluid analyzer of FIG. 1.

Shown in FIG. 3 is another embodiment of the amperometric sensor 22 that can be used in accordance with the present disclosure. In this embodiment, the amperometric sensor 22 is provided with the electrodes 30 including but not limited to the reference electrode 34, the counter electrode 36, and the working electrode 38 on a substrate 84. The substrate 84 may extend outwardly from the electrodes 30. The amperometric sensor 22 may be also provided with a gasket 86 having an opening 90 sized and dimensioned to be larger than the area of the substrate 84 encompassed by the electrodes 30. The gasket 86 may be positioned on the substrate 84 such that the gasket 86 does not overlap with the electrodes 30. Rather, the gasket 86 may engage the substrate 84 around the electrodes 38. The amperometric sensor 22 may also include a cover 94 that is positioned on the gasket 86 such that the gasket 86 is between the substrate 84 and the cover 94. The opening 90 within the gasket 86, in conjunction with the cover 94 and the substrate 84, forms a chamber (not shown) through which the fluid can pass and interact with the electrodes 30. An entry port 98 and an exit port 102 can be formed within the cover 94 to permit the fluid to enter and exit the chamber (not shown).

Returning to FIG. 1, a fluid may flow through the fluid channel 42 by a driving force provided by a driving device 106. The driving force may include but is not limited to capillary force, pressure, gravity, vacuum, electrokinesis, and/or the like. The driving device 106 may be, for example but without limitation, a pump. A sample may be introduced into the fluid channel 42 via a sample injection port 110. The sample injection port 110 may be in communication with a valve 114 that can be manually or machine opened and/or closed to allow and/or prevent the sample from injuring the fluid channel 42. The sample can be manually injected or injected by a machine into the sample injection port 110.

In some embodiments, the fluid channel 42 may be a hollow channel. The fluid channel 42 may also comprise a waste output 116, whereby the fluid exits the fluid channel 42 after contacting at least one, and preferably all, of the amperometric sensors 22.

Referring to FIG. 2, for example, the fluid channel 42 may deliver the sample to the chamber 54. The chamber 54 may indirectly intersect with the amperometric sensor 22 including, for example but without limitation, the reference electrode 34, the counter electrode 36, and the working electrode 38 via the electrolyte layer 62 and the permeable membrane 66. In some embodiments, the chamber 54 may be a hollow channel. The substrates 50 and 84 may be formed of materials including but not limited to plastic, ceramic, glass, and/or any material capable of containing electrodes 30. For example, in some embodiments, the substrates 50 and 84 may be formed of polyethylene terephthalate (hereinafter "PET").

As shown in FIG. 2, the electrodes 30 for the amperometric sensors 22, including for example the reference electrode 34, the counter electrode 36, and the working electrode 38, may include one or more conductive layer 118 (hereinafter "conductive layers 118"). The conductive layers 118 may be formed of any suitable conductive material, including but not limited to carbon, silver, silver chloride, gold, platinum, palladium, and/or the like. The conductive layers 118 may be sputtered, electroplated, screen-printed, inkjet-printed, bonded and/or applied using any other technique capable of applying conductive material to the housing 26 associated with fabrication of the amperometric sensors 22.

In some embodiments, the conductive layers 118 are formed by laser ablation of a gold-sputtered metal film on a backing. Alternatively, in some embodiments, the conductive layers 118 are formed of localized positioning of a carbon within the housing 26. As illustrated in FIGS. 1 and 2, the electrodes 30, including but without limitation, the reference electrode 34, the counter electrode 36, and the working electrode 38 may also include leads 122 for connection to a meter 126.

In some embodiments, the meter 126 is a potentiostat. In such embodiments, the meter 126 may receive signals generated by the reference electrode 34, the counter electrode 36, and the working electrode 38 in contact with a fluid comprising a target analyte such as oxygen within a sample, a quality control reagent, and/or a calibration reagent and transforms the signals into information to correlate the electric potentials to the amount of target analyte in the fluid. The meter 126 may measure a current between two electrodes of a plurality of electrodes 30 and controls a voltage difference between the two electrodes of the plurality of electrodes 30. For example, when the amperometric sensors 22 include the reference electrode 34 and the working electrode 38, the meter 126 may measure the current between the reference electrode 34 and the working electrode 38 and controls a voltage difference between the reference electrode 34 and the working electrode 38.

In embodiments in which the amperometric sensors 22 include the counter electrode 36, the meter 126 may measure the current flow between the working electrode 38 and the counter electrode 36 and control the voltage difference between the working electrode 38 and the reference electrode 34. The reference electrode 34, the counter electrode 36, and the working electrode 38 may provide a reversible or the reversible set of reactions and may not require consumption of the electrodes 30. The current measured by the meter 126 when a voltage is applied across the working electrode 38 and the reference electrode 34 is correlated to the target analyte content of the fluid.

In some embodiments, the fluid analyzer 10 may further comprise one or more calibration reagent injection port 130-1, 130-2, and 130-3 (hereinafter "calibration reagent injection ports 130") which may be in fluidic communication with the fluid channel 42. The calibration reagent injection ports 130 may also be in communication with valves 134-1, 134-2, and 134-3 (hereinafter "valves 134") that can be manually or machine opened and/or closed to allow and/or prevent one or more calibration reagents and/or wash fluids from entering the fluid channel 42. The valves 134 may be automated valves that may open or close upon receipt of a suitable control signal. In some embodiments, the calibration reagent injection port 130-3 is a wash fluid injection port.

In some embodiments, the calibration reagent injection ports 130 are in fluidic communication with the calibration cartridge 14 comprising one or more calibration reagents. In some embodiments, the calibration cartridge 14 comprises at least three reservoirs 132-1, 132-2, and 132-3 (hereinafter "reservoirs 132"). The reservoir 132-1 may contain a first calibration reagent having a first known target analyte level (e.g., 105 mM of chloride, 0.3 mM of magnesium, 4 mM of potassium, 160 mM of sodium, 7.4 pH, 30 mmHg of bicarbonate, 1.2 mM of calcium, and/or 10 mg/dl of blood urea nitrogen). The reservoir 132-2 may contain a second calibration reagent having a second known target analyte level (e.g., 100 mM of chloride, 0.6 mM of magnesium, 8 mM of potassium, 115 mM of sodium, 6.8 pH, 70 mmHg of bicarbonate, 0.6 mM of calcium, and/or 70 mg/dl of blood urea nitrogen), and the reservoir 132-3 may contain a wash fluid. The wash fluid may be an aqueous wash reagent typically containing a surfactant to remove the calibration reagents and/or the sample from the interior of the housing 26 abutting the chamber 54, for example.

Referring again to FIG. 1, the meter 126, the driving device 106, and the valves 114, 134-1, and 134-2, may be in communication with a control system 138 via signal paths 142. The signal paths 142, as shown in FIG. 1, may be, for example but without limitation, one or more cables which convey data produced by the meter 126 to the control system 138 and/or information, signals, and/or commands from the control system 138 to the valves 114 and 134 in electronic form and/or via the network as described in detail herein. The control system 138 is shown in more detail in FIG. 5. The control system 138 may be a system or systems that are able to embody and/or execute the logic of the processes described herein. Logic embodied in the form of software instructions and/or firmware may be executed on any appropriate hardware. For example, logic embodied in the form of software instructions and/or firmware may be executed on dedicated system or systems, on a personal computer system, on a distributed processing computer system, and/or the like. In some embodiments, logic may be implemented in a stand-alone environment operating on a single computer system and/or logic may be implemented in a networked environment such as a distributed system using multiple computers and/or processors.

Referring again to FIG. 1, in some embodiments, the calibration cartridge 14 comprising the calibration reagents is in fluidic communication with one or more quality control fluid injection port (hereinafter "quality control fluid injection ports") (not shown) that are in fluidic communication with the fluid channel 42. In one embodiment, the quality control injection ports (not shown) are in fluidic communication with one or more quality control fluid valve (thereinafter "quality control fluid valves") (not shown), whereby the quality control fluid valves (not shown) may be manually or machine opened and/or closed to allow and/or prevent the quality control fluids from entering the fluid channel 42. The quality control fluid valves (not shown) may be automated valves that may open or close upon receipt of a suitable control signal.

In some embodiments, the fluid analyzer 10 comprises a plurality of electrochemical sensors 18 and a plurality of corresponding meters 126.

Figure 4:
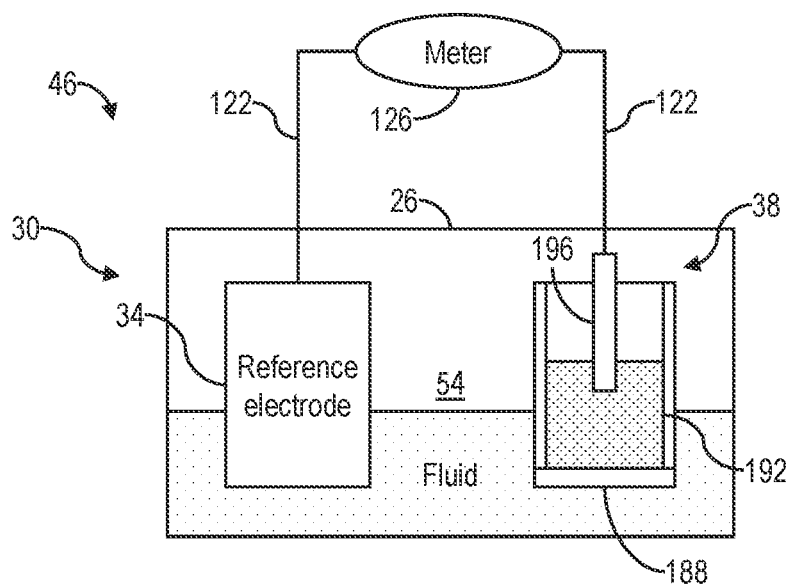
FIG. 4 is a cross-sectional view of an exemplary embodiment of a prior art potentiometric sensor that may be read by the fluid analyzer of FIG. 1.

Referring now to FIG. 4, the potentiometric sensors 46 generally comprise two or more electrodes 30 which are shown by way of example as a reference electrode 34 and a working electrode 38. The working electrode 38 may be an ion-selective electrode comprising a cover membrane 188, an internal electrolyte layer 192, and an internal reference electrode 196. The cover membrane may include, for example but not by way of limitation, a plasticized PVC membrane doped with an analyte-sensing ionophore, and may include other additives.

The internal electrolyte layer 192 may include, for example but not by way of limitation, an aqueous solution and/or hydrogel/hydrophilic polymers as the internal electrolyte. In one embodiment, a metal salt in solution is dispersed in a carbon paste, hydrogel, or hydrophilic polymer to form the internal electrolyte layer 192. At least a portion of the internal electrolyte layer 192 may be screen printed on at least a portion of the internal reference electrode 196. At least a portion of the cover membrane 188 may be disposed on at least a portion of the internal electrolyte layer 192. Any internal reference electrodes 196 and cover membranes 188 known in the art or otherwise contemplated herein may be utilized in accordance with the presently described methodology, so long as the potentiometric sensor 46 may function in accordance with the presently described methodology.

In particular (but nonlimiting) embodiments, the cover membrane 188 may be selected from the group comprising a chloride sensing membrane, a magnesium sensing membrane, a potassium sensing membrane, a sodium sensing membrane, a pH sensing membrane and, a bicarbonate sensing membrane a calcium sensing membrane, and a blood urea nitrogen sensing membrane; and/or the metal salt dispersed in the carbon paste, hydrogel, or hydrophilic polymer may be selected from the group comprising $MgCl_2$, HCl, NaCl, KCl, $KNO_3$, and $NaClO_4$. In illustrative embodiment, the metal salt may be any solution when dispersed in the carbon paste, hydrogel, or hydrophilic polymer. Examples of such a solution include water-based solutions. The internal reference electrode 196 may be constructed of, for example but not by way of limitation, silver, silver chloride, and/or the like.

Figure 5:
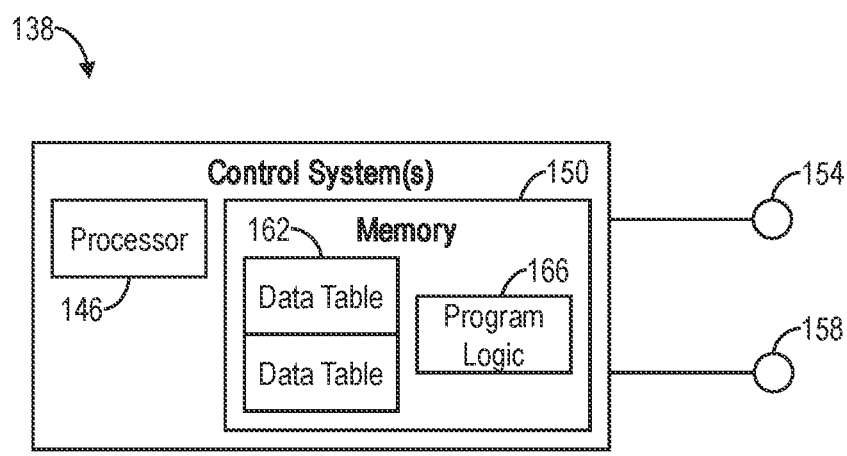
FIG. 5 is a block diagram of a control system of the fluid analyzer depicted in FIG. 1.

Shown in FIG. 5 is a block diagram of the control system 138 which may include one or more processors 146 (hereinafter "processor 146") working together or independently to execute processor executable code, one or more memories 150 (hereinafter "memories 150") capable of storing processor executable code, one or more input devices 154 (hereinafter "input devices 154"), and one or more output devices 158 (hereinafter "output devices 158").

In some embodiments, when executed, the processor executable code causes the processor 146 to, at a first time period: control the automated valve 134-1 to pass the first calibration reagent through the fluid channel 42 to the reference electrode 34 and the working electrode 38 (and the counter electrode 36 when included in the amperometric sensor 22) of each electrochemical sensor 18; control the meter 126 (when the meter 126 is a potentiostat) to apply a voltage potential to the reference electrode 34 and the working electrode 38 of each electrochemical sensor 18 sufficient to induce an electrochemical reaction in the sample of the first calibration reagent and receive a first reading for each electrochemical sensor 18 from the meter 126; control the automated valve 134-2 to pass the second calibration reagent through the fluid channel 42 to the reference electrode 34 and the working electrode 38 (and the counter electrode 36 when included in the amperometric sensor 22); control the meter 126 (when the meter 126 is a potentiostat) to apply a voltage potential to the reference electrode 34 and the working electrode 38 of each electrochemical sensor 18 sufficient to induce an electrochemical reaction in the sample of the second calibration reagent and receive a second reading for each electrochemical sensor 18 from the meter 126; calculate first calibration parameters for each electrochemical sensor 18 using the first reading, the second reading and a multi-point calibration algorithm such as, for example, the multi-point calibration algorithm described in U.S. Pat. No. 11,293,889 by Li (which is incorporated herein by reference); and measure the target analyte content within a fluid sample using the first calibration parameters to calculate a first response slope $m_1$ in accordance with formula (3) described below.

In some embodiments, when executed, the processor executable code further causes the processor 146 to, at a second time period after the first time period: control the automated valve 134-1 to pass the first calibration reagent through the fluid channel 42 to the reference electrode 34 and the working electrode 38 (and the counter electrode 36 when included in the amperometric sensor 22) of each electrochemical sensor 18; control the meter 126 (when the meter 126 is a potentiostat) to apply a voltage potential to the reference electrode 34 and the working electrode 38 of each electrochemical sensor 18 sufficient to induce an electrochemical reaction in the sample of the first calibration reagent and receive a third reading for each electrochemical sensor 18 from the meter 126; control the automated valve 134-2 to pass the second calibration reagent through the fluid channel 42 to the reference electrode 34 and the working electrode 38 (and the counter electrode 36 when included in the amperometric sensor 22) of each electrochemical sensor 18; control the meter 126 (when the meter 126 is a potentiostat) to apply a voltage potential to the reference electrode 34 and the working electrode 38 of each electrochemical sensor 18 sufficient to induce an electrochemical reaction in the sample of the second calibration reagent and receive a fourth reading for each electrochemical sensor 18 from the meter 126; calculate second calibration parameters using the third reading, the fourth reading, and a multi-point calibration algorithm (as described above); and measure the target analyte content within a fluid sample using the second calibration parameters to calculate a second response slope $m_2$ in accordance with formula (4) described below.

In some embodiments, when executed, the processor executable code further causes the processor 146 to: determine whether a difference between the first response slope $m_1$ and the second response slope $m_2$ for each electrochemical sensor 18 is above or below a predetermined threshold (i.e., outside a predetermined threshold range) in accordance with formula (2) above; and responsive to a determination that the difference between the first response slope $m_1$ and the second response slope $m_2$ (i.e., $\Delta m$) is outside the predetermined threshold range, store data indicative of an obstruction on the electrochemical sensors 18.

In some embodiments, the step of controlling the meter 126 to apply the voltage potential to the reference electrode 34 and the working electrode 38 of each electrochemical sensor 18 sufficient to induce an electrochemical reaction in the sample of the first calibration reagent and receive a first reading for each electrochemical sensor 18 from the meter 126 is replaced with a step in which the processor 146 receives a first reading from the meter 126, the first reading indicative of a first electric potential generated by the reference electrode 34 and the working electrode 38 contacting the first calibration reagent. In some embodiments, the step of controlling the meter 126 to apply a voltage potential to the reference electrode 34 and the working electrode 38 of each electrochemical sensor 18 sufficient to induce an electrochemical reaction in the sample of the second calibration reagent and receive a second reading for each electrochemical sensor 18 from the meter 126 is replaced with a step in which the processor 146 receives a second reading from the meter 126, the second reading indicative of a second electric potential generated by the reference electrode 34 and the working electrode 38 contacting the second calibration reagent.

In some embodiments, the step of controlling the meter 126 to apply the voltage potential to the reference electrode 34 and the working electrode 38 of each electrochemical sensor 18 sufficient to induce an electrochemical reaction in the sample of the first calibration reagent and receive a third reading for each electrochemical sensor 18 from the meter 126 is replaced with a step in which the processor 146 receives third reading from the meter 126, the third reading indicative of a third electric potential generated by the reference electrode 34 and the working electrode 38 contacting the first calibration reagent. In some embodiments, the step of controlling the meter 126 to apply a voltage potential to the reference electrode 34 and the working electrode 38 of each electrochemical sensor 18 sufficient to induce an electrochemical reaction in the sample of the second calibration reagent and receive a fourth reading for each electrochemical sensor 18 from the meter 126 is replaced with a step in which the processor 146 receives a fourth reading from the meter 126, the fourth reading indicative of a fourth electric potential generated by the reference electrode 34 and the working electrode 38 contacting the second calibration reagent.

Each element of the control system 138 may be partially or completely network-based or cloud-based, and may or may not be located within a single physical location. In some embodiments, the processor 146 may communicate with the meter 126, the driving device 106, and/or the valves 114 and 134 via a network. As used herein, the terms "network-based", "cloud-based", and any variations thereof, are intended to include the provision of configurable computational resources on demand via interfacing with a computer and/or computer network, with software and/or data at least partially located on the computer and/or computer network. The network may permit bi-directional communication of information and/or data between each element of the control system 138. The network may interface with the processor 146 and the meter 126, the driving device 106, and/or the valves 114 and 134 in a variety of ways. For example, but without limitation, the network may interface by optical and/or electronic interfaces, and/or may use a plurality of network topographies and/or protocols including, but not limited to, Ethernet, TCP/IP, circuit switched paths, combinations thereof, and/or the like. For example, in some embodiments, the network may be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switch telephone network, an Ethernet network, combinations thereof, and/or the like. Additionally, the network may use a variety of protocols to permit bidirectional interface and/or communication of data and/or information between the processor 146 and the meter 126, driving device 106, and/or the valves 114 and 134.

In some embodiments, the network may be the Internet and/or other network. For example, if the network is the Internet, a primary user interface of the control system 138 may be delivered through a series of web pages (e.g., target analyte concentration determination webpages). It should be noted that the primary user interface of the control system and 38 may also be another type of interface including, but not limited to, a Windows-based application.

The processor 146 may be implemented as a single processor or multiple processors working together, or independently, to execute the logic as described herein. It is to be understood that in certain embodiments when using more than one processor 146, the processors 146 may be located remotely from one another, located in the same location, or comprising a unitary multi-core processor. The processor 146 may be capable of reading and/or executing processor executable code and/or capable of creating, manipulating, retrieving, altering and/or storing data structure(s) into the memory 150.

Exemplary embodiments of the processor 146 may include, but are not limited to, a digital signal processor (DSP), a central processing unit (CPU), a field programmable gate array (FPGA), a microprocessor, a multi-core processor, combinations thereof, and/or the like, for example. In some embodiments, additional processors 146 may include, but are not limited to, implementation as a personal computer, a cellular telephone, a smart phone, network-capable television set, a television set-top box, a tablet, an e-book reader, a laptop computer, a desktop computer, a network-capable handheld device, a video game console, a server, a digital video recorder, a DVD-player, a Blu-Ray player, and/or combinations thereof, for example.

The processor 146 may be capable of communicating with the memory 150 via a path (e.g., data bus). The processor 146 may also be capable of communicating with the input device 154 and/or the output device 158.

The processor 146 may be capable of interfacing and/or communicating with the meter 126, driving device 106, and/or the valves 114 and 134. For example, the processor 146 may be capable of communicating by exchanging signals (e.g., analog, digital, optical, and/or the like) using a network protocol.

The memory 150 may be capable of storing processor executable code. Additionally, the memory 150 may be implemented as a conventional non-transient memory, such as, for example, random access memory (RAM), a CD-ROM, a hard drive, a solid-state drive, a flash drive, a memory card, a DVD-ROM, a floppy disk, an optical drive, combinations thereof, and/or the like.

In some embodiments, the memory 150 may be located in the same physical location as the processor 146, and/or the memory 150 may be located remotely from the processor 146. For example, the memory 150 may be located remotely from the processor 146 and communicate with other processors via the network. Additionally, when more than one memory 150 is used, a first memory may be located in the same physical location as the processor 146, and additional memories 150 may be located in a remote physical location from the processor 146. Additionally, the memory 150 may be implemented as a "cloud memory" (i.e., one or more memories 150 may be partially or completely based on or accessed using the network).

The input device 154 may be capable of receiving information input from a user and/or processor(s) 146 and may be capable of transmitting such information to the processor 146, the network, and/or the meter 126, the driving device 106, and/or the valves 114 and 134. The input device 154 may include, but is not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, combinations thereof, and the like, for example.

The output device 158 may be capable of outputting information in a form perceivable by a user and/or processors(s) 146. For example, the output device 158 may include, but is not limited to, implementation as a computer monitor, a screen, a touchscreen, a speaker, a website, a television set, a smart phone, a PDA, a cell phone, a fax machine, a printer, a laptop computer, combinations thereof, and/or the like, for example. It is to be understood that in some exemplary embodiments, the input device 154 and the output device 158 may be implemented as a single device, such as, for example, a touchscreen or a tablet. It is to be further understood that as used herein the term user is not limited to a human being, and may comprise, a computer, a server, a website, a processor, a network interface, a human, a user terminal, a virtual computer, combinations thereof, and/or the like, for example.

The memory 150 may store processor executable code and/or information comprising one or more databases and/or data tables 162 (hereinafter "data stores 162") and program logic 166 (also referred to herein as "calibration logic"). In some embodiments, the processor executable code may be stored as a data structure, such as data stores 162, for example. In some embodiments, outputs of the meter 126, driving device 106, and/or the valves 114 and 134 may be stored in the data stores 162 within the memory 150.

In some embodiments, outputs of the meter 126, each corresponding to a particular one of the electrochemical sensors 18, may be stored in the memory 150 as data structures, such as data stores 162, for example. In some embodiments, each output of the meter 126 may be stored as an individual data structure (e.g., data stores 162) provided with a unique identifier, each unique identifier identifying the electrochemical sensor 18 to which the particular output of the meter 126 corresponds.

Figure 6:
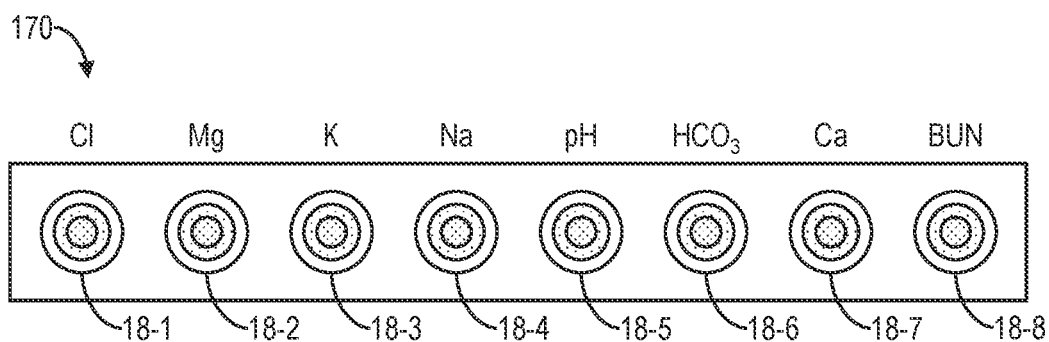
FIG. 6 is a top view of a sensor array to be read by the fluid analyzer depicted in FIG. 1.

Referring now to FIG. 6, shown therein is another exemplary embodiment of a sensor array 170 of the fluid analyzer 10. The sensor array 170 may include a plurality of electrochemical sensors 18. In the embodiment shown in FIG. 6, the sensor array 170 is provided with a chloride sensor 18-1, a magnesium sensor 18-2, a potassium sensor 18-3, a sodium sensor 18-4, a pH sensor 18-5, a bicarbonate sensor 18-6, a calcium sensor 18-7, and a blood urea nitrogen sensor 18-8. However, in other embodiments, the sensor array 170 may be provided with any combination of electrochemical sensors 18 that is capable of determining at least one analyte within a sample. It should be understood that the electrochemical sensors 18 may be arranged in any order.

Figure 7:
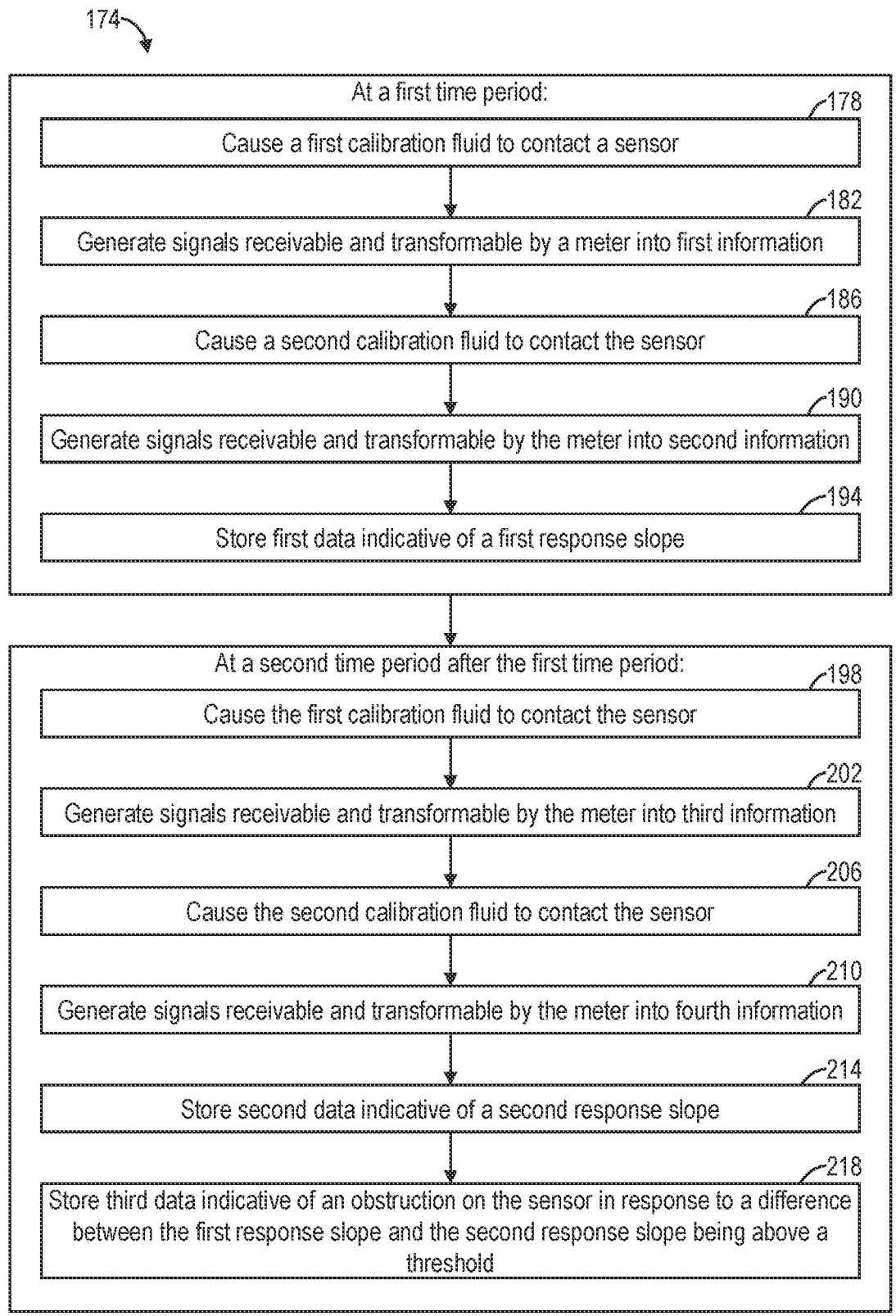
FIG. 7 is a process flow diagram of an exemplary obstruction detection algorithm in accordance with the present disclosure.

FIG. 7 illustrates an embodiment of the obstruction detection algorithm 174 for detecting the presence (or absence) of an obstruction on at least one of the electrochemical sensors 18 of the fluid analyzer 10. The algorithm 174 includes computer executable instructions that may be performed periodically by the processor 146 to ensure that the electrochemical sensors 18 are providing accurate results.

At a first time period, at a step 178, the processor 146 may cause a first calibration reagent having a first predetermined target analyte level (or concentration) to contact at least one of the electrochemical sensors 18 (i.e., the reference electrode 34, the counter electrode 36, and/or the working electrode 38) within the sensor array. This can be accomplished by the processor 146 of the control system 138 generating and sending signals that open the automated valve 134-1 and actuate the driving device 106 to pass the first calibration reagent from the fluid reservoir 132-1 through the fluid channel 42 to the chamber 54 of at least one of the electrochemical sensors 18, for example. When a sufficient amount of the first calibration reagent is within the chamber 54, the processor 146 of the control system 138 may close the automated valve 134-1 and de-actuate the driving device 106.

Once the first calibration reagent contacts at least one of the electrochemical sensors 18 (i.e., the reference electrode 34, the counter electrode 36, and/or the working electrode 38), at a step 182, a particular electrochemical sensor 18 may generate a first reading indicative of at least one of an electric potential and an electric current (i.e., a faradaic current and/or a non-faradaic current) generated by an electrochemical reaction occurring between the electrochemical sensor 18 (i.e., the reference electrode 34, the counter electrode 36, and/or the working electrode 38) and the target analyte within the first calibration reagent. The meter 126 may then receive the first reading and pass the first reading to the processor 146 of the control system 138.

In some embodiments, at least two of the electrochemical sensors 18 may generate respective first readings indicative of at least one of an electric potential and an electric current (i.e., a faradaic current and/or a non-faradaic current) generated by an electrochemical reaction occurring between each of the at least two of the electrochemical sensors 18 (i.e., the reference electrode 34, the counter electrode 36, and/or the working electrode 38) and the target analyte within the first calibration reagent. The corresponding meters 126 may then receive the respective first readings from the at least two of the electrochemical sensors 18 and pass the respective first readings to the processor 146 of the control system 138.

In some embodiments where the electrochemical sensor 18 is an amperometric sensor 22, the processor 146 of the control system 138 again provides a control signal to the meter 126 to cause the meter 126 to apply a first electric potential to the amperometric sensor 22 (i.e., the reference electrode 34, the counter electrode 36, and/or the working electrode 38) sufficient to induce an electrochemical reaction in the sample of the first calibration reagent. The meter 126 then receives the first reading from the amperometric sensor 22. In such embodiments, the first reading may be indicative of a faradaic current generated by an electrochemical reaction (e.g., a redox reaction) occurring between the amperometric sensor 22 (i.e., the reference electrode 34, the counter electrode 36, and/or the working electrode 38) and the target analyte (e.g., oxygen) within the first calibration reagent.

In some embodiments where the electrochemical sensor 18 is a potentiometric sensor 46, the meter 126 may merely receive the first reading from the potentiometric sensor 46 in response to the first calibration reagent contacting the potentiometric sensor 46 (i.e., the reference electrode 34 and/or the working electrode 38). In such embodiments, the first reading may be indicative of an electric potential generated by an electrochemical reaction (e.g., an ionic activity) occurring between the potentiometric sensor 46 (i.e., the reference electrode 34 and/or the working electrode 38) and the target analyte (e.g., oxygen) within the first calibration reagent.

At a step 186, the processor 146 may cause a second calibration reagent having a second predetermined target analyte level (or concentration) to contact at least one, some, or all of the electrochemical sensors 18 (i.e., the reference electrode 34, the counter electrode 36, and/or the working electrode 38) in the sensor array 170. This can be accomplished by the processor 146 of the control system 138 generating and passing signals that open the automated valve 134-2 and actuate the driving device 106 to pass the second calibration reagent from the fluid reservoir 132-2 through the fluid channel 42 to the chamber 54, for example. When a sufficient amount of the second calibration reagent is within the chamber 54, the processor 146 of the control system 138 may generate and pass signals to close the automated valve 134-2 and de-actuate the driving device 106. The second predetermined target analyte level may be different from the first predetermined target analyte level.

Once the second calibration reagent contacts the electrochemical sensor 18 (i.e., the reference electrode 34, the counter electrode 36, and/or the working electrode 38), at a step 190, each of the electrochemical sensors 18 may generate a second reading indicative of at least one of an electric potential and an electric current (i.e., a faradaic current and/or a non-faradaic current) generated by an electrochemical reaction occurring between the electrochemical sensor 18 (i.e., the reference electrode 34, the counter electrode 36, and/or the working electrode 38) and the target analyte within the second calibration reagent.

In some embodiments where the electrochemical sensor 18 is an amperometric sensor 22, the processor 146 of the control system 138 provides a control signal to the meter 126 to cause the meter 126 to apply a second electric potential to the amperometric sensor 22 (i.e., the reference electrode 34, the counter electrode 36, and/or the working electrode 38) insufficient to induce an electrochemical reaction in the sample of the second calibration reagent. The second electric potential may be determined and/or applied using a voltage potential stepping technique in which a series of sequentially greater or smaller voltage potentials are applied. When the current from the amperometric sensor 22 (i.e., the reference electrode 34, the counter electrode 36, and/or the working electrode 38) levels off, then it is determined that the second electric potential is insufficient to induce an electrochemical reaction in the calibration reagent. The meter 126 then receives the second reading from the amperometric sensor 22. In such embodiments, the second reading may be indicative of a non-faradaic current generated by an electrochemical reaction (e.g., a redox reaction) occurring between the amperometric sensor 22 (i.e., the reference electrode 34, the counter electrode 36, and/or the working electrode 38) and the target analyte (e.g., oxygen) within the second calibration reagent. The meter 126 may then pass the second reading(s) to the processor 146 of the control system 138.

In some embodiments where the electrochemical sensor 18 is a potentiometric sensor 46, the meter 126 receives the second reading from the potentiometric sensor 46 in response to the second calibration reagent contacting the potentiometric sensor 46 (i.e., the reference electrode 34 and/or the working electrode 38). In such embodiments, the second reading may be indicative of an electric potential generated by an electrochemical reaction (e.g., an ionic activity) occurring between the potentiometric sensor 46 (i.e., the reference electrode 34 and/or the working electrode 38) and the target analyte e.g., oxygen) within the second calibration reagent.

The meter 126 may transmit data indicative of the first reading and/or the second reading to the processor 146 of the control system 138, which may use the processor 146 to calculate a first response slope using the first reading and/or the second reading for each of the electrochemical sensors 18. The first response slope of an individual sensor may be calculated by the processor 146 based at least in part on a difference between the first reading and the second reading generated by the same, individual sensor. In some embodiments, the first response slope $m_1$ is calculated by the processor 146 using the formula (3):

$$m_1 = \frac{V_1 - V_2}{\log C_1 - \log C_2} \qquad (3)$$

where $V_1$ is the first reading of a sensor, $V_2$ is the second reading of the same sensor, $C_1$ is the concentration of the first calibration reagent, and $C_2$ is the concentration of the second calibration reagent. At a step 194, the processor 146 of the control system 138 may store first data indicative of the first response slope. The first data may be stored within the data table 162 within the memory 150 and may be used as described below for determining whether an obstruction is present (or absent) on particular ones of the electrochemical sensors 18.

In some embodiments, responsive to receiving the data indicative of the first reading and/or the second reading from the meter 126, the processor 146 of the control system 138 calculates first calibration parameters using the first reading, the second reading, and a multi-point calibration algorithm (as described above). The first calibration parameters may be stored within the data table 162 within the memory 150 and used for measuring the target analyte content of fluids.

At a second time period after the first time period, at a step 198, the processor 146 may cause the first calibration reagent having the first predetermined target analyte level to contact the electrochemical sensor 18 (i.e., the reference electrode 34, the counter electrode 36, and/or the working electrode 38) again. This can be accomplished by the processor 146 of the control system 138 generating and passing signals that open the automated valve 134-1 and actuate the driving device 106 to pass the first calibration reagent from the fluid reservoir 132-1 through the fluid channel 42 to the chamber 54, for example. When a sufficient amount of the first calibration reagent is within the chamber 54, the control system 138 may close the automated valve 134-1 and de-actuate the driving device 106.

Once the first calibration reagent contacts the electrochemical sensor 18 (i.e., the reference electrode 34, the counter electrode 36, and/or the working electrode 38) again, at a step 202, the electrochemical sensor 18 may generate a third reading indicative of at least one of an electric potential and an electric current (i.e., a faradaic current and/or a non-faradaic current) generated by an electrochemical reaction occurring between the electrochemical sensor 18 (i.e., the reference electrode 34, the counter electrode 36, and/or the working electrode 38) and the target analyte within the first calibration reagent.

In some embodiments where the electrochemical sensor 18 is an amperometric sensor 22, the processor 146 of the control system 138 again provides a control signal to the meter 126 to cause the meter 126 to apply a first electric potential to the amperometric sensor 22 (i.e., the reference electrode 34, the counter electrode 36, and/or the working electrode 38) sufficient to induce an electrochemical reaction in the sample of the first calibration reagent. The meter 126 then receives the third reading from the amperometric sensor 22. In such embodiments, the third reading may be indicative of a faradaic current generated by an electrochemical reaction (e.g., a redox reaction) occurring between the amperometric sensor 22 (i.e., the reference electrode 34, the counter electrode 36, and/or the working electrode 38) and the target analyte (e.g., oxygen) within the first calibration reagent.

In some embodiments where the electrochemical sensor 18 is a potentiometric sensor 46, the meter 126 receives the third reading from the potentiometric sensor 46 in response to the first calibration reagent contacting the potentiometric sensor 46 (i.e., the reference electrode 34 and/or the working electrode 38) again. In such embodiments, the third reading may be indicative of an electric potential generated by an electrochemical reaction (e.g., an ionic activity) occurring between the potentiometric sensor 46 (i.e., the reference electrode 34 and/or the working electrode 38) and the target analyte (e.g., oxygen) within the first calibration reagent.

At a step 206, the processor 146 may cause the second calibration reagent having the second predetermined target analyte level to contact the electrochemical sensor 18 (i.e., the reference electrode 34, the counter electrode 36, and/or the working electrode 38) again. This can be accomplished by the control system 138 opening the automated valve 134-2 and actuating the driving device 106 to pass the second calibration reagent from the fluid reservoir 132-2 through the fluid channel 42 to the chamber 54, for example. When a sufficient amount of the second calibration reagent is within the chamber 54, the control system 138 may close the automated valve 134-2 and de-actuate the driving device 106. The second predetermined target analyte level may be different from the first predetermined target analyte level.

Once the second calibration reagent contacts the electrochemical sensor 18 (i.e., the reference electrode 34, the counter electrode 36, and/or the working electrode 38) again, at a step 210, the electrochemical sensor 18 may generate a fourth reading indicative of at least one of an electric potential and an electric current (i.e., a faradaic current and/or a non-faradaic current) generated by an electrochemical reaction occurring between the electrochemical sensor 18 (i.e., the reference electrode 34, the counter electrode 36, and/or the working electrode 38) and the target analyte within the second calibration reagent.

In some embodiments where the electrochemical sensor 18 is an amperometric sensor 22, the processor 146 of the control system 138 again provides a control signal to the meter 126 to cause the meter 126 to apply a second electric potential to the amperometric sensor 22 (i.e., the reference electrode 34, the counter electrode 36, and/or the working electrode 38) insufficient to induce an electrochemical reaction in the sample of the second calibration reagent. The second electric potential may be determined and/or applied using a voltage potential stepping technique in which a series of sequentially greater or smaller voltage potentials are applied. When the current from the amperometric sensor 22 (i.e., the reference electrode 34, the counter electrode 36, and/or the working electrode 38) levels off, then it is determined that the second electric potential is insufficient to induce an electrochemical reaction in the calibration reagent. The meter 126 then receives the fourth reading from the amperometric sensor 22. In such embodiments, the fourth reading may be indicative of a non-faradaic current generated by an electrochemical reaction (e.g., a redox reaction) occurring between the amperometric sensor 22 (i.e., the reference electrode 34, the counter electrode 36, and/or the working electrode 38) and the target analyte (e.g., oxygen) within the second calibration reagent.

In some embodiments where the electrochemical sensor 18 is a potentiometric sensor 46, the meter 126 receives the fourth reading from the potentiometric sensor 46 in response to the second calibration reagent contacting the potentiometric sensor 46 (i.e., the reference electrode 34 and/or the working electrode 38). In such embodiments, the fourth reading may be indicative of an electric potential generated by an electrochemical reaction (e.g., an ionic activity) occurring between the potentiometric sensor 46 (i.e., the reference electrode 34 and/or the working electrode 38) and the target analyte (e.g., oxygen) within the second calibration reagent.

The meter 126 may transmit data indicative of the third reading and/or the fourth reading to the processor 146 of the control system 138, which calculates a second response slope for an individual one of the sensors 18 using the third reading and/or the fourth reading generated from the same, individual sensor. The second response slope may be based at least in part on a difference between the third reading and the fourth reading. The first response slope $m_1$ and the second response slope $m_2$ may be calculated from the same, individual sensor, where the first reading, the second reading, the third reading, and the fourth reading are generated from the same, individual sensor. In some embodiments, the second response slope $m_2$ is calculated by the processor 146 using the formula (4):

$$m_2 = \frac{V_3 - V_4}{\log C_1 - \log C_2} \quad (4)$$

where $V_3$ is the third reading of a sensor, $V_4$ is the fourth reading of the same sensor, $C_1$ is the concentration of the first calibration reagent, and $C_2$ is the concentration of the second calibration reagent. At a step 214, the processor 146 of the control system 138 stores second data indicative of the second response slope. The second data may be stored within the data table 162 within the memory 150 and may be used as described below for determining whether an obstruction is present (or absent) on particular ones of the electrochemical sensor 18.

In some embodiments, responsive to receiving the data indicative of the third reading and/or the fourth reading from the meter 126, the processor 146 of the control system 138 calculates second calibration parameters using the third reading, the fourth reading, and the multi-point calibration algorithm (as described above). The second calibration parameters may be stored within the data table 162 within the memory 150 and used for measuring the target analyte content of fluids.

At a step 218, the processor 146 of the control system 138 calculates a difference (also referred to herein as "delta slope") between the first response slope and the second response slope (i.e., $\Delta m=|m_1-m_2|$) and compares the calculated difference with a predetermined threshold. The difference may be calculated based on the same, individual sensor (i.e., based on a first response slope and a second response slope calculated from the same, individual sensor). Where the calculated difference is greater than the predetermined threshold, the processor 146 of the control system 138 stores third data indicative of an obstruction being detected on the electrochemical sensor 18. When the sensor array 170 includes multiple electrochemical sensors 18, the processor 146 may store the third data for each electrochemical sensor 18 in a manner that is correlated with particular electrochemical sensors 18. In some embodiments, in response to detection of an obstruction, the processor 146 of the control system 138 opens/closes the automated valve 134-3 (also referred to herein as "the wash fluid valve 134-3") and actuates/de-actuates the driving device 106 so as to pass the wash fluid through the fluid channel 42 and the chamber 54 to wash the electrochemical sensor 18 for removal of the obstruction. In some embodiments, in response to detection of an obstruction, the processor 146 of the control system 138 uses the output device 158 to output the third data in a form perceivable by a user to alert or indicate to the user of the presence of an obstruction, such as an auditory or visual alert.

In some embodiments, where the calculated difference is less than the predetermined threshold, the control system 138 uses the processor 146 to store fourth data indicative of a lack of an obstruction being detected on the electrochemical sensor 18. In some embodiments, where the calculated difference is less than the predetermined threshold, no data is stored and normal operation of the fluid analyzer 10 continues. In some embodiments, in response to detection of an absence of an obstruction, the processor 146 of the control system 138 uses the output device 158 to output an alert or indication (e.g., an auditory or visual alert or indication) indicating the absence of an obstruction in a form perceivable by a user.

Thereafter, the fluid analyzer 10 may be used to apply a fluid sample having an unknown target analyte content to the electrochemical sensor 18 (i.e., the working electrode 34, the counter electrode 36, and/or the reference electrode 38) and then measure a target analyte content of the fluid sample with the first calibration parameters and/or the second calibration parameters.

Figure 8:
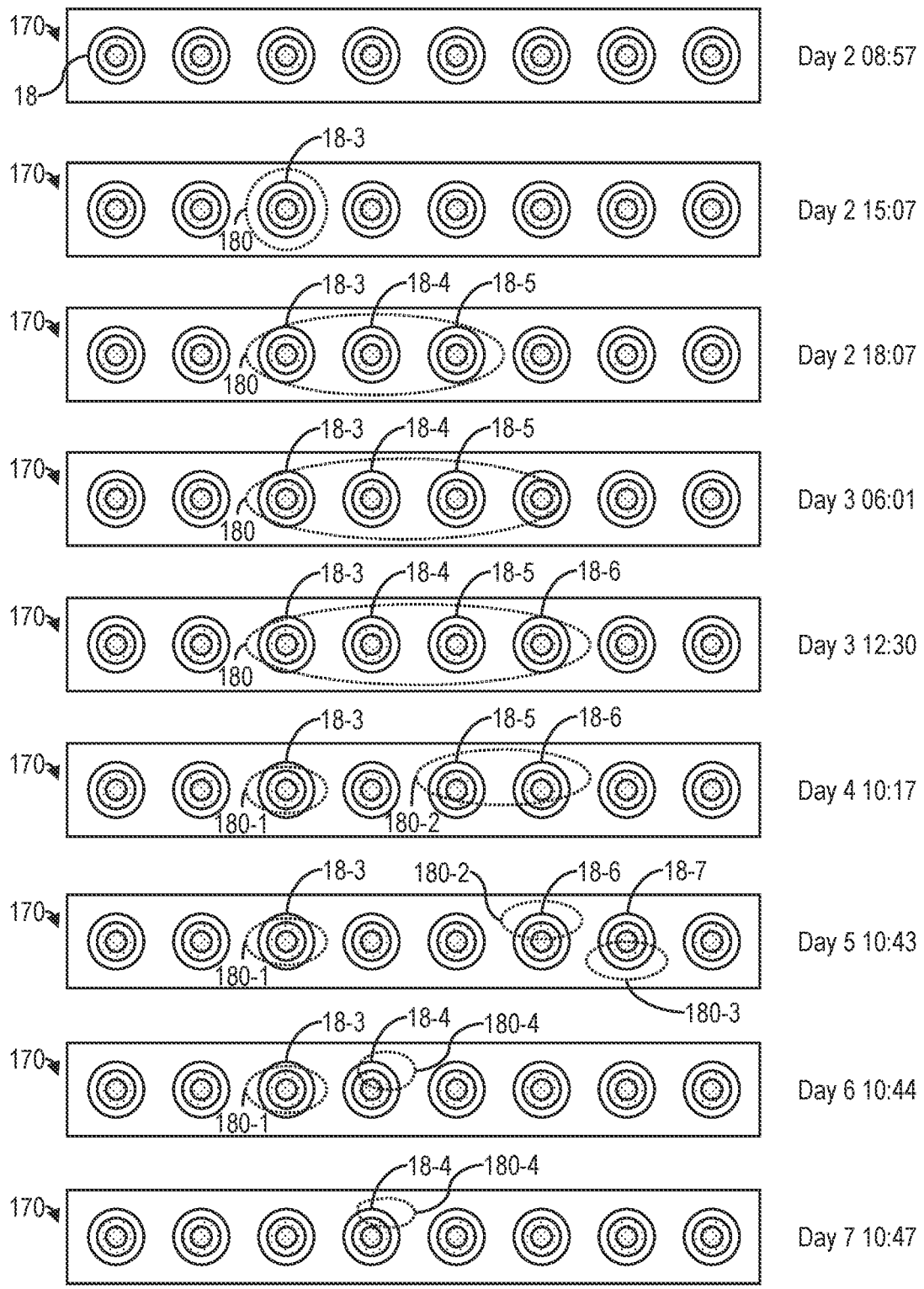
FIG. 8 is a time-lapse diagram of the sensor array of the fluid analyzer depicted in FIG. 6.

Referring now to FIG. 8, shown therein is a time-lapse of the sensor array 170 shown in FIG. 6. FIG. 8 illustrates an obstruction 180 being formed on the potassium sensor 18-3 on Day 2 at time 15:07; the obstruction 180 migrating from the potassium sensor 18-3 to downstream positions (i.e., the sodium sensor 18-4, the pH sensor 18-5, and the bicarbonate sensor 18-6) on Day 2 at time 18:07 through Day 3 at time 12:30; the obstruction 180 separating itself into a first obstruction 180-1 on the potassium sensor 18-3 and a second obstruction 180-2 on the pH sensor 18-5 and the bicarbonate sensor 18-6 on Day 4 at time 10:17; the obstruction 180 separating itself further into a first obstruction 180-1 on the potassium sensor 18-3, a second obstruction 180-2 on the bicarbonate sensor 18-6, and a third obstruction 180-3 on the calcium sensor 18-7 on Day 5 at time 10:43; presence of a fourth obstruction 180-4 on the sodium sensor 18-4 on Day 6 at time 10:44; and the obstruction 180 being partially removed (i.e., the second obstruction 180-2 and the third obstruction 180-3 being removed) on Day 6 at time 10:44; before the obstruction 180 is further removed (i.e., the first obstruction 180-1 being removed) on Day 7 at time 10:47; and the fourth obstruction 180-4 remaining on the sodium sensor 18-4 on Day 7 at time 10:47 for final removal of the obstruction 180 by the obstruction removal process performed by the fluid analyzer or user thereof.

Figure 9A:
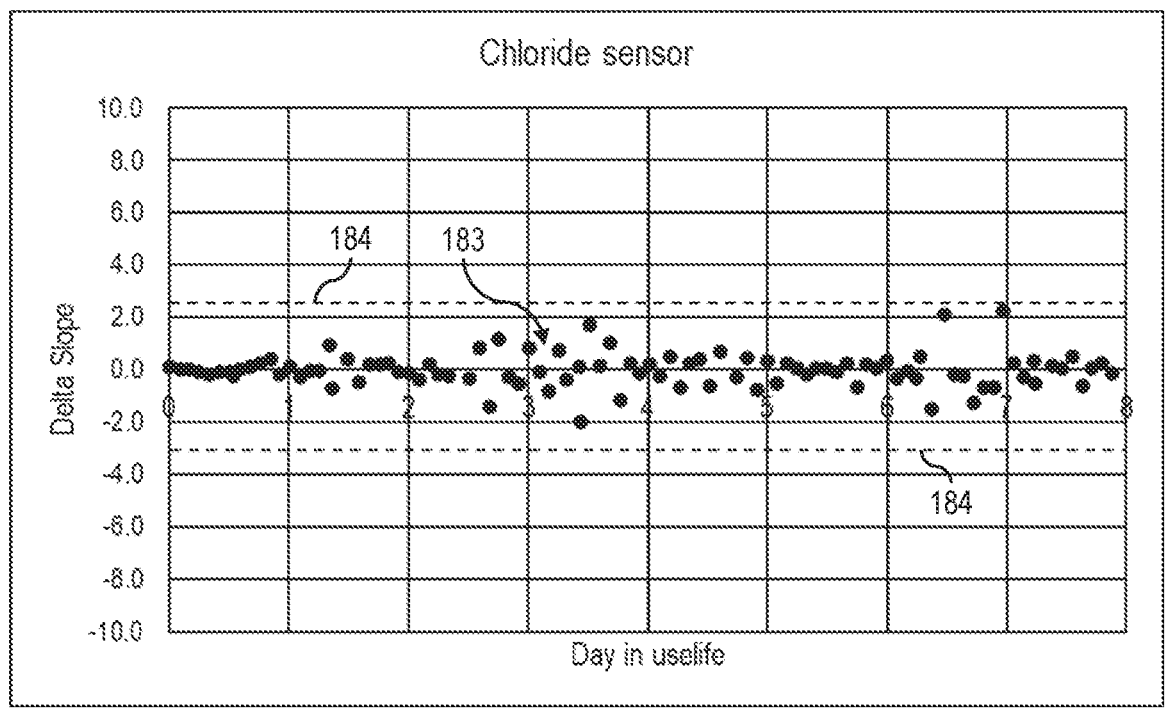
FIGS. 9A-9G are graphs of a sensor response of electrochemical sensors of the sensor array corresponding to the time-lapse diagram depicted in FIG. 8.

Referring now to FIGS. 9A-9G, shown therein are graphs depicting a delta slope 183 (i.e., $\Delta m$) of each of the electrochemical sensors 18 shown in FIG. 6 over a period corresponding to the timeframe shown in FIG. 8. In FIG. 9A, it can be seen that nowhere is the delta slope 183 for the chloride sensor 18-1 outside a predetermined threshold 184 (e.g., +3 mV/D) (millivolts per decade) for the chloride sensor 18-1. Thus, nowhere during the timeframe does the delta slope 183 for the chloride sensor 18-1 indicate the presence of an obstruction 180. Similarly, in FIG. 9B, it can be seen that nowhere is the delta slope 183 for the magnesium sensor 18-2 outside the predetermined threshold 184 (e.g., +1.5 mV/D) for the magnesium sensor 18-2. Thus, nowhere during the timeframe does the delta slope 183 for the magnesium sensor 18-2 indicate the presence of an obstruction 180.

Figure 9B:
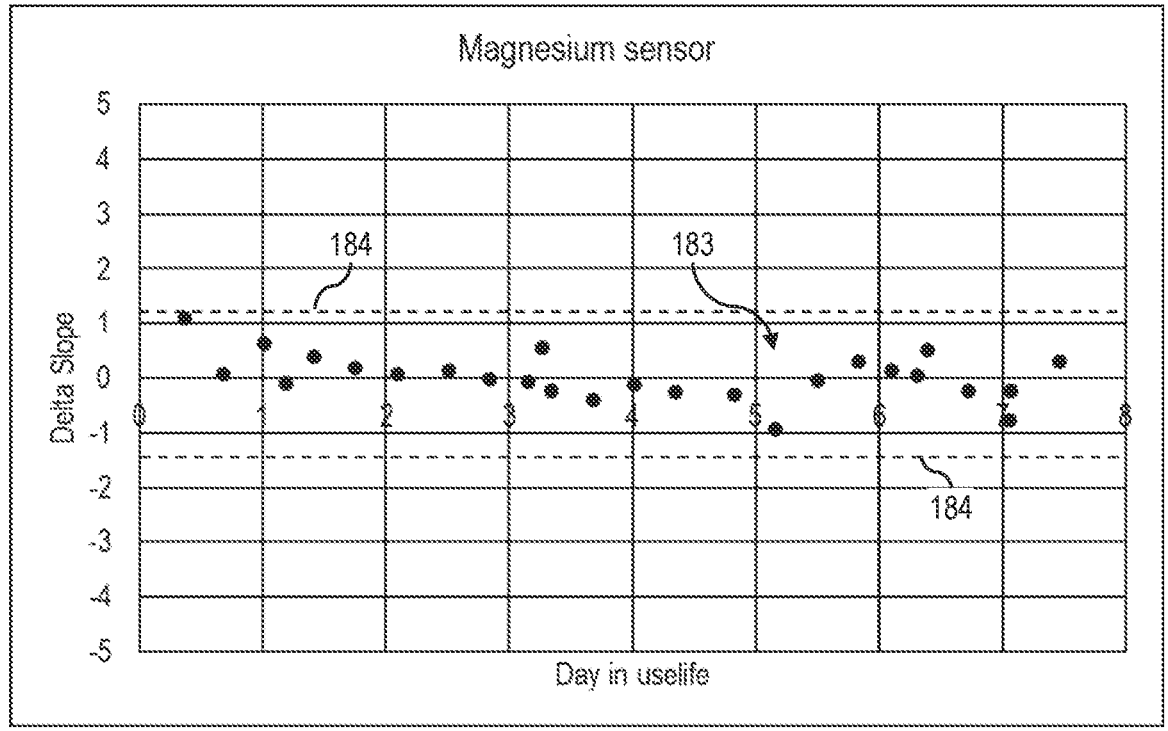
Figure 9C:
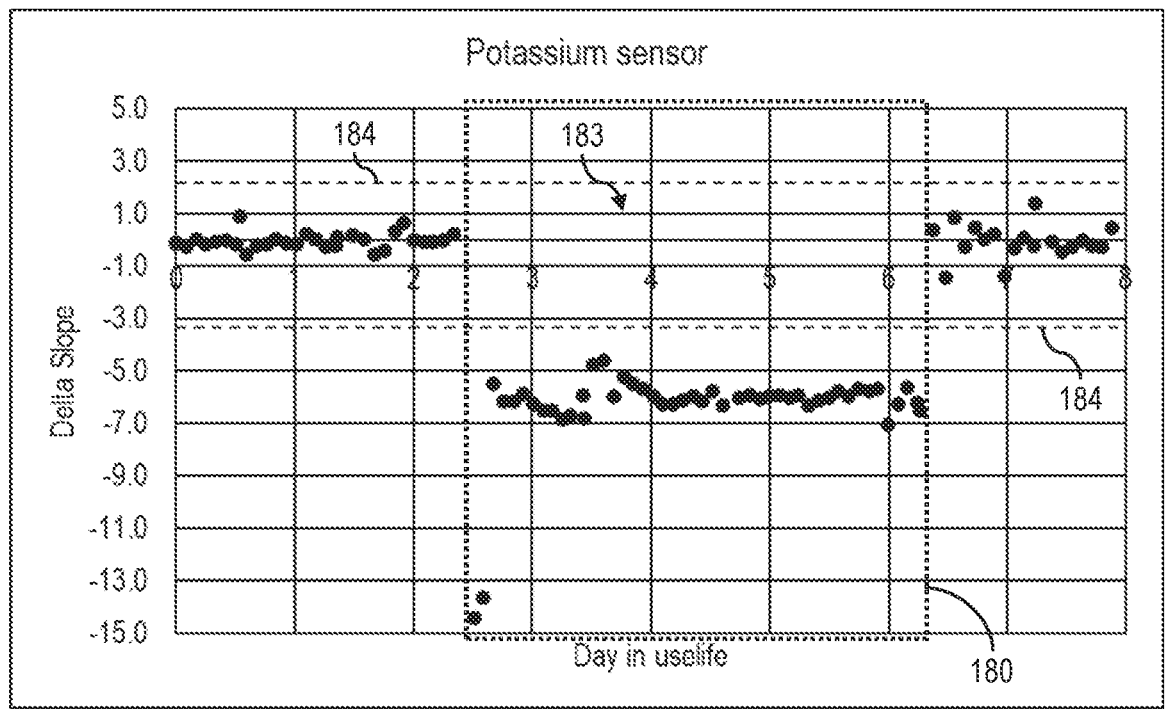

In FIG. 9C, however, it can be seen that the delta slope 183 for the potassium sensor 18-3 is outside the predetermined threshold 184 (e.g., +3 mV/D) for the potassium sensor 18-3 during the period from approximately Day 2 to approximately Day 6, thus indicating the presence of an obstruction 180 during such period.

Figure 9D:
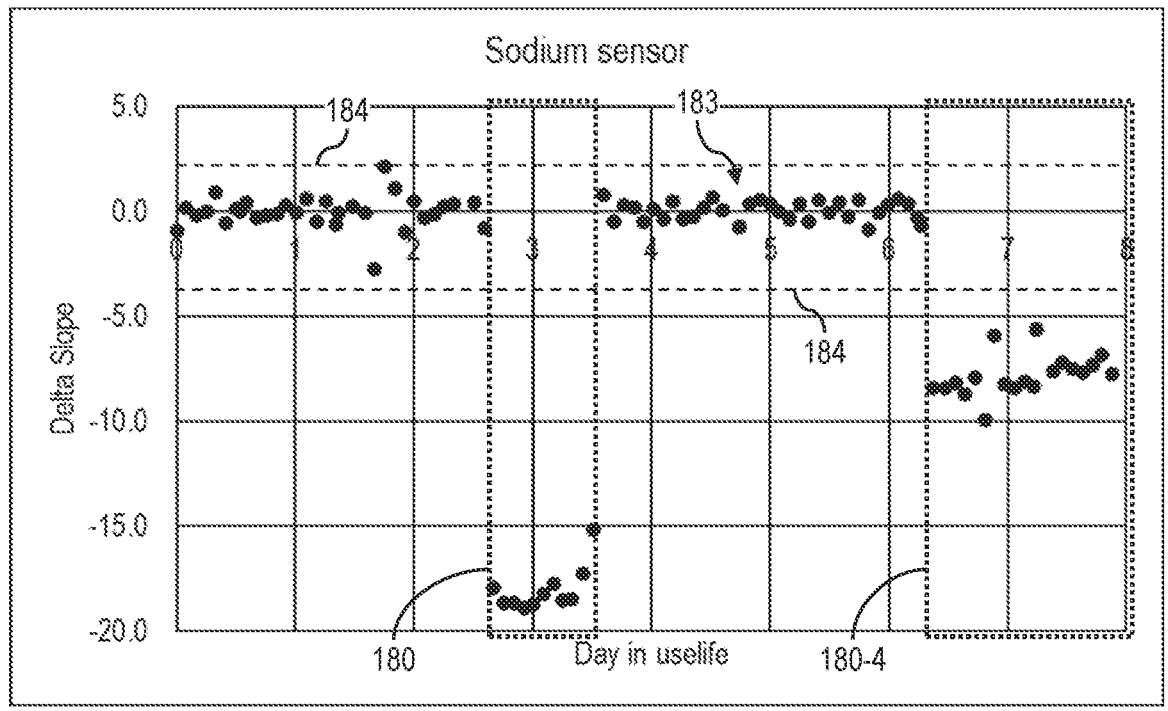

In FIG. 9D, it can be seen that the delta slope 183 for the sodium sensor 18-4 is outside the predetermined threshold 184 (e.g., +3 mV/D) during a first period from approximately Day 2 to approximately Day 3 and a second period from approximately Day 6 to approximately Day 8 (i.e., through a majority of Day 7), thus indicating the presence of two obstructions 180: a first obstruction (indicated as 180 in FIG. 8) during such first period and a second obstruction (indicated as 180-4 in FIG. 8) during such second period.

Figure 9E:
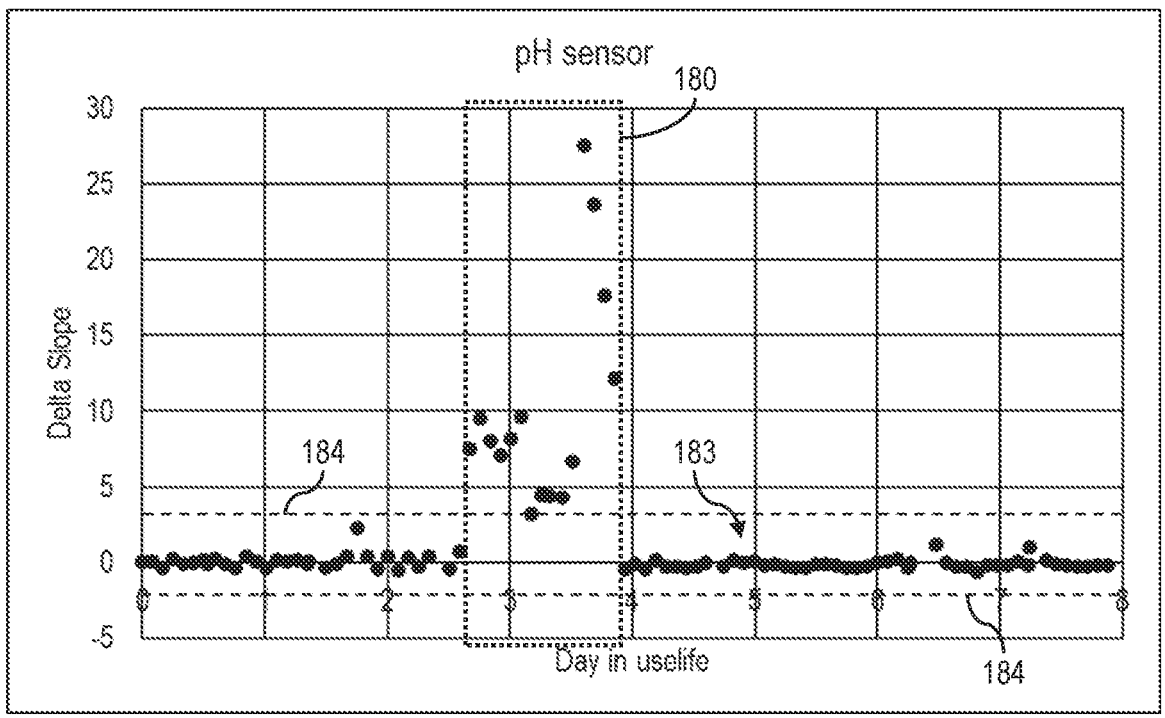
Figure 9F:
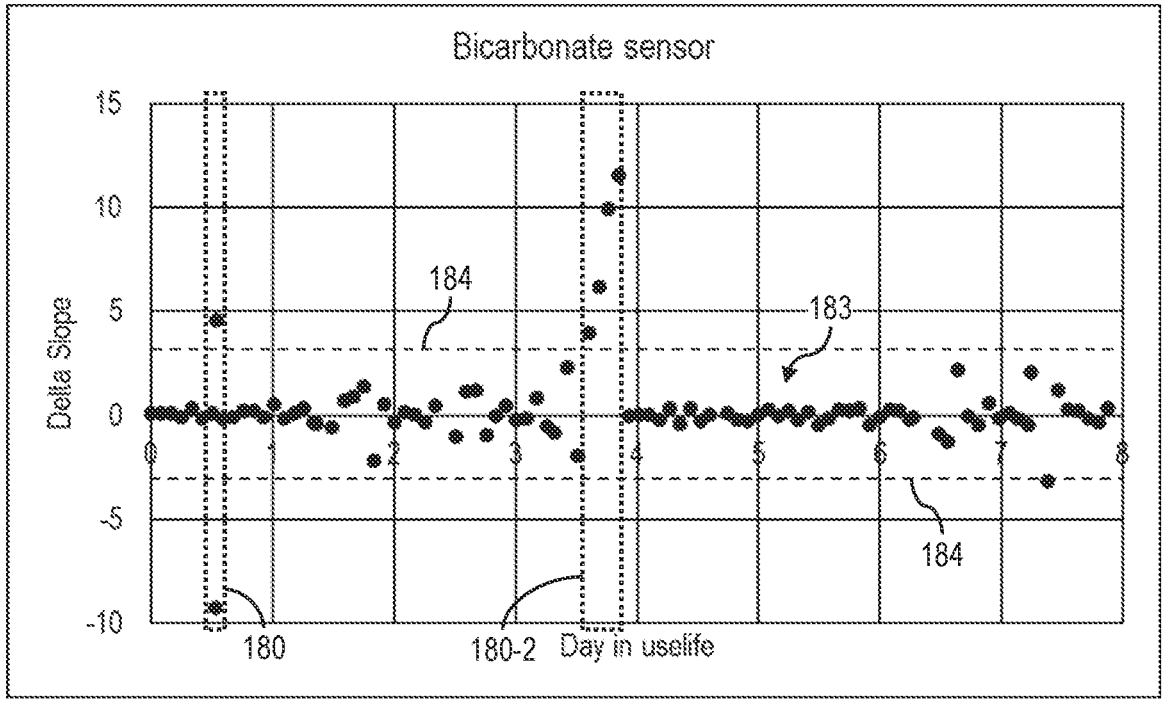

In FIG. 9E, it can be seen that the delta slope 183 for the pH sensor 18-5 is outside the predetermined threshold 184 (e.g., ±3 mV/D) during a period from approximately Day 2 to approximately Day 4, thus indicating the presence of an obstruction 180 during such period. In FIG. 9F, it can be seen that the delta slope 183 for the bicarbonate sensor 18-6 is outside the predetermined threshold 184 (e.g., ±3 mV/D) during a first period occurring approximately on Day 0 and during a second period occurring approximately on Day 4, thus indicating the presence of two obstructions 180: a first obstruction 180 (not shown in FIG. 8) during such first period and a second obstruction (indicated as 180-2 in FIG. 8) during such second period.

Figure 9G:
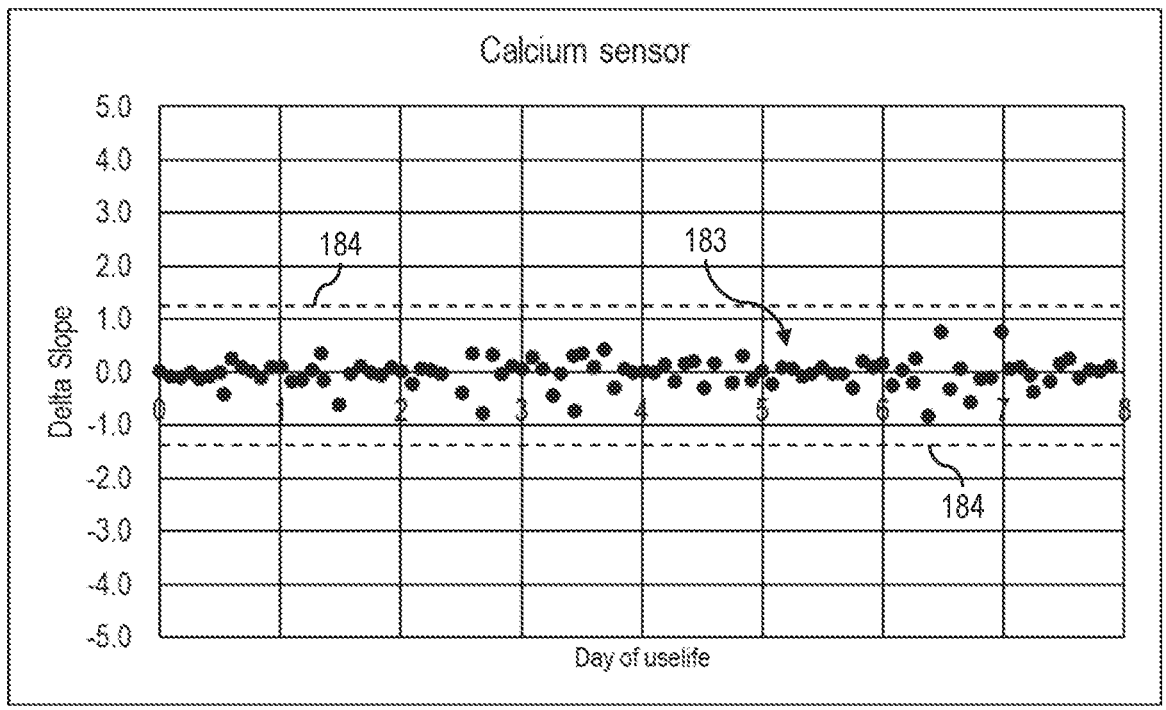

Finally, in FIG. 9G, similarly to FIGS. 9A-9B, nowhere is the delta slope 183 for the calcium sensor 18-7 outside a predetermined threshold 184 (e.g., ±1.5 mV/D) for the calcium sensor 18-7. Thus, nowhere during the timeframe does the delta slope 183 for the calcium sensor 18-7 indicate the presence of an obstruction 180.

Although no graph is shown depicting a delta slope 183 of the blood urea nitrogen sensor 18-8 shown in FIG. 6, in some embodiments, a predetermined threshold 184 for the blood urea nitrogen sensor 18-8 may be, for example, ±3 mV/D.

In some embodiments, the fluid analyzer 10 may further comprise a magnesium-specific calibration reagent injection port (not shown), which may be in fluidic communication with the fluid channel 42. The magnesium-specific calibration reagent injection port may also be in communication with a magnesium-specific valve (not shown) that can be manually or machine opened and/or closed to allow and/or prevent a magnesium-specific calibration reagent from entering the fluid channel 42. The magnesium-specific valve may be an automated valve that may open or close upon receipt of a suitable control signal.

In some embodiments, the magnesium-specific calibration reagent injection port is in fluidic communication with the calibration cartridge 14 comprising a magnesium-specific calibration reagent, which may be in addition to the one or more calibration reagents described above. In some embodiments, the calibration cartridge 14 further comprises a magnesium-specific reservoir (not shown). The magnesium-specific reservoir may contain a magnesium-specific calibration reagent having a known target analyte level.

In some embodiments, the magnesium sensor 18-2 may experience interference caused by calcium ions present in the fluid sample. In order to correct for such interference, in some embodiments, when executed, the processor executable code further causes the processor 146 to, at the first time period: control the automated magnesium-specific valve to pass the magnesium-specific calibration reagent through the fluid channel 42 to the reference electrode 34 and the working electrode 38 (and the counter electrode 36 when included in the amperometric sensor 22) of the magnesium sensor 18-2; control the meter 126 (when the meter 126 is a potentiostat) to apply a voltage potential to the reference electrode 34 and the working electrode 38 of the magnesium sensor 18-2 sufficient to induce an electrochemical reaction in the sample of the magnesium-specific calibration reagent and receive a fifth reading for the magnesium sensor 18-2 from the meter 126.

In some embodiments, the step of calculating the first calibration parameters for each electrochemical sensor 18 using the first reading, the second reading, and a multi-point calibration algorithm (as described above) may be further described as calculating the first calibration parameters for the magnesium sensor 18-2 using the first reading, the second reading, the fifth reading, and the multi-point calibration algorithm, and calculating the first calibration parameters for the other electrochemical sensors 18 using the first reading, the second reading, and the multi-point calibration algorithm.

Further, in some embodiments, when executed, the processor executable code further causes the processor 146 to, at the second time period after the first time period: control the automated magnesium-specific valve to pass the magnesium-specific calibration reagent through the fluid channel 42 to the reference electrode 34 and the working electrode 38 (and the counter electrode 36 when included in the amperometric sensor 22) of the magnesium sensor 18-2; control the meter 126 (when the meter 126 is a potentiostat) to apply a voltage potential to the reference electrode 34 and the working electrode 38 of the magnesium sensor 18-2 sufficient to induce an electrochemical reaction in the sample of the magnesium-specific calibration reagent and receive a sixth reading for the magnesium sensor 18-2 from the meter 126.

In some embodiments, the step of calculating the second calibration parameters for each electrochemical sensor 18 using the third reading, fourth reading, and a multi-point calibration algorithm (as described above) may be further described as calculating the second calibration parameters for the magnesium sensor 18-2 using the third reading, the fourth reading, the sixth reading, and the multi-point calibration algorithm, and calculating the second calibration parameters for the other electrochemical sensors 18 using the first reading, the second reading, and the multi-point calibration algorithm.

Non-Limiting Illustrative Embodiments

The following is a numbered list of non-limiting illustrative embodiments of the inventive concept disclosed herein:
1. A fluid analyzer, comprising:
   a fluid channel operable to carry fluids;
   a sensor in fluidic communication with the fluid channel;
   a meter operable to receive signals generated by the sensor and transform the signals into information indicative of an electric potential of the fluids;
   a first calibration fluid having a first analyte concentration;
   a second calibration fluid having a second analyte concentration different from the first analyte concentration;
   one or more calibration fluid injection port in fluidic communication with the fluid channel, the one or more calibration fluid injection port being operable to receive a first calibration fluid and a second calibration fluid;
   one or more valve positioned between the one or more calibration fluid injection port and the sensor, the one or more valve being openable and closeable to provide one or more sample of each of the first calibration fluid and the second calibration fluid to the fluid channel; and
   a control system having a processor operable to execute processor-executable code that when executed by the processor causes the processor to run an obstruction detection algorithm comprising:
      at a first time period, controlling the one or more valve to successively pass the first calibration fluid and the second calibration fluid through the fluid channel to the sensor, and storing first data indicative of a first response slope based at least in part on a first difference between first information generated by the meter indicative of a first electric potential generated by the sensor contacting the first calibration fluid and second information indicative of a second electric potential generated by the sensor contacting the second calibration fluid;

at a second time period after the first time period, controlling the one or more valve to successively pass the first calibration fluid and the second calibration fluid through the fluid channel to the sensor, and storing second data indicative of a second response slope based at least in part on a second difference between third information indicative of a third electric potential generated by the sensor contacting the first calibration fluid and fourth information generated by the meter indicative of a fourth electric potential generated by the sensor contacting the second calibration fluid; and storing third data indicative of an obstruction on the sensor in response to a difference between the first response slope and the second response slope being beyond a threshold.

2. The fluid analyzer of illustrative embodiment 1, wherein the sensor comprises a working electrode and a reference electrode.

3. The fluid analyzer of any one of illustrative embodiments 1-2, wherein the working electrode is one of a chloride ion-selective electrode, a magnesium ion-selective electrode, a potassium ion-selective electrode, a sodium ion-selective electrode, a hydrogen ion-selective electrode, a bicarbonate ion-selective electrode, a calcium ion-selective electrode, and a blood urea nitrogen ion-selective electrode.

4. The fluid analyzer of any one of illustrative embodiments 1-3, wherein the first response slope is based at least in part on a quotient having as a dividend a difference between the first information and the second information and having as a divisor a difference between a logarithm of the first analyte concentration and a logarithm of the second analyte concentration, and the second response slope is based at least in part on a quotient having as a dividend a difference between the third information and the fourth information and having as a divisor a difference between the logarithm of the first analyte concentration and the logarithm of the second analyte concentration.

5. The fluid analyzer of any one of illustrative embodiments 1-4, wherein the one or more valve comprises a first calibration valve and a second calibration valve, the first calibration valve being openable and closeable to provide one or more sample of the first calibration fluid to the fluid channel, and the second calibration valve being openable and closeable to provide one or more sample of the second calibration fluid to the fluid channel.

6. The fluid analyzer of one of illustrative embodiments 1-5, further comprising a wash fluid injection port in fluidic communication with the fluid channel and a wash fluid valve positioned between the wash fluid injection port and the sensor, the wash fluid injection port being operable to receive a wash fluid, and the wash fluid valve being openable and closeable to provide the wash fluid to the fluid channel.

7. The fluid analyzer of any one of illustrative embodiments 1-6, wherein the processor-executable code when executed by the processor further causes the processor to control the wash fluid valve to pass the wash fluid through the fluid channel to the sensor based at least in part on the third data.

8. The fluid analyzer of any one of illustrative embodiments 1-7, wherein the obstruction is a blood clot.

9. A method of detecting an obstruction on a sensor of a fluid analyzer, comprising:

at a first time period, successively causing flow of a first calibration fluid and a second calibration fluid having known analyte concentrations to the sensor and determining a first response sensitivity of the sensor based at least in part on the known analyte concentrations and the sensor responses of the sensor to the first calibration fluid and the second calibration fluid;

at a second time period, successively causing flow of the first calibration fluid and the second calibration fluid to the sensor and determining a second response sensitivity of the sensor based at least in part on the known analyte concentrations and the sensor responses of the sensor to the first calibration fluid and the second calibration fluid; and determining, by a processor, presence of the obstruction on the sensor based on at least in part on a difference between the first response sensitivity and the second response sensitivity.

10. The method of any one of the preceding illustrative embodiments, wherein the step of determining the presence of the obstruction determines the presence of the obstruction when the difference is outside a predetermined threshold range.

11. The method of any one of the preceding illustrative embodiments, wherein the step of determining the presence of the obstruction determines absence of the obstruction when the difference is inside a predetermined threshold range.

12. The method of any one of the preceding illustrative embodiments, wherein the known analyte concentration of the first calibration fluid and the known analyte concentration of the second calibration fluid are different.

13. The method of any one of the preceding illustrative embodiments, wherein the first response sensitivity is a first response slope of the sensor, the second response sensitivity is a second response slope of the sensor, and wherein the method further comprises a step of determining each of the first response slope and the second response slope by respectively dividing a difference between the sensor responses of the sensor to the first calibration fluid and the second calibration fluid by a difference between logarithms of the known concentrations.

14. The method of any one of the preceding illustrative embodiments, wherein:

at the first time period, the step of successively causing the flow of the first calibration fluid and the second calibration fluid comprises:

causing the first calibration fluid to contact the sensor to generate signals receivable and transformable by a meter into first information indicative of a first sensor response of the sensor responses, wherein the first sensor response is an electric potential generated by the sensor responsive to contacting the first calibration fluid;

causing the second calibration fluid to contact the sensor to generate signals receivable and transformable by the meter into second information indicative of a second sensor response of the sensor responses, wherein the second sensor response is an electric potential generated by the sensor responsive to contacting the second calibration fluid; and storing first data indicative of the first response slope based at least in part on a difference between the first information and the second information; and wherein at the second time period after the first time period the step of successively causing the flow of the first calibration fluid and the second calibration fluid comprises:

causing the first calibration fluid to contact the sensor to generate signals receivable and transformable by the meter into third information indicative of a third sensor response of the sensor responses, wherein the third sensor response is a third electric potential generated by the sensor responsive to contacting the first calibration fluid;

causing the second calibration fluid to contact the sensor to generate signals receivable and transformable by the meter into fourth information indicative of a fourth sensor response of the sensor responses, wherein the fourth sensor response is a fourth electric potential generated by the sensor responsive to contacting the second calibration fluid;

storing second data indicative of the second response slope based at least in part on a difference between the third information and the fourth information; and storing third data indicative of the presence of the obstruction on the sensor in response to a difference between the first response slope and the second response slope being beyond a threshold.

15. The method of any one of the preceding illustrative embodiments, wherein the first response slope is based at least in part on a quotient having as a dividend the difference between the first information and the second information and having as a divisor a difference between logarithms of the known analyte concentrations, and the second response slope is based at least in part on a quotient having as a dividend the difference between the third information and the fourth information and having as a divisor the difference between the logarithms of the known analyte concentrations.

16. The method of any one of the preceding illustrative embodiments, wherein the method further comprises a step of causing a wash fluid to contact the sensor based at least in part on the step of determining the presence of the obstruction.

17. The method of any one of the preceding illustrative embodiments, wherein the method further comprises a step of storing the third data indicative of a blood clot on the sensor in response to the difference between the first response slope and the second response slope being beyond the threshold.

18. A fluid analyzer, comprising:

a sensor configured to measure at least one parameter associated with a fluid;

one or more container configured to store a first calibration fluid and a second calibration fluid having known analyte concentrations;

one or more channel configured to provide fluid communication among the sensor and the one or more container; and a processor configured to determine presence of an obstruction obstructing the sensor, wherein the processor is configured to:

at a first time period, successively cause flow of the first calibration fluid and the second calibration fluid to the sensor and determine a first response sensitivity of the sensor based on at least in part on the known analyte concentrations and the sensor responses of the sensor to the first calibration fluid and the second calibration fluid;

at a second time period, successively cause flow of the first calibration fluid and the second calibration fluid to the sensor and determine a second response sensitivity of the sensor based at least in part on the known analyte concentrations and sensor responses of the sensor to the first calibration fluid and the second calibration fluid; and determine the presence of the obstruction based on at least in part on a difference between the first response sensitivity and the second response sensitivity.

19. The fluid analyzer of any one of the preceding illustrative embodiments, wherein the processor is configured to determine the presence of the obstruction when the difference between the first response sensitivity and the second response sensitivity is outside a predetermined threshold range.

20. The fluid analyzer of any one of the preceding illustrative embodiments, wherein the sensor comprises a working electrode and a reference electrode, the working electrode being one of a chloride ion-selective electrode, a magnesium ion-selective electrode, a potassium ion-selective electrode, a sodium ion-selective electrode, a hydrogen ion-selective electrode, a bicarbonate ion-selective electrode, a calcium ion-selective electrode, and a blood urea nitrogen ion-selective electrode.

21. The fluid analyzer of any one of the preceding illustrative embodiments, wherein the first response sensitivity is a first response slope of the sensor, the second response sensitivity is a second response slope of the sensor, and wherein the processor is configured to determine each of the first response slope and the second response slope by respectively dividing a difference between the sensor responses of the sensor to the first calibration fluid and the second calibration fluid by a difference between logarithms of the known concentrations.

22. The fluid analyzer of any one of the preceding illustrative embodiments, further comprising a wash fluid injection port in fluidic communication with the one or more channel and a wash fluid valve positioned between the wash fluid injection port and the sensor, the wash fluid injection port being operable to receive a wash fluid, and the wash fluid valve being openable and closeable to provide the wash fluid to the one or more channel.

23. The fluid analyzer of any one of the preceding illustrative embodiments, wherein the processor is further configured to control the wash fluid valve to pass the wash fluid through the one or more channel to the sensor in response to determining the presence of the obstruction.

24. The fluid analyzer of any one of the preceding illustrative embodiments, wherein the obstruction is a blood clot.

25. A non-transitory computer readable medium storing an obstruction detection algorithm comprising processor-executable code that when executed by a processor causes the processor to:

at a first time period, control one or more valve to successively pass a first calibration fluid and a second calibration fluid through a fluid channel to a sensor, and store first data indicative of a first response slope based at least in part on a first difference between first information generated by a meter indicative of a first electric potential generated by the sensor contacting the first calibration fluid and second information generated by the meter indicative of a second electric potential generated by the sensor contacting the second calibration fluid;

at a second time period after the first time period, control the one or more valve to successively pass the first calibration fluid and the second calibration fluid through the fluid channel to the sensor, and store second data indicative of a second response slope based at least in part on a second difference between third information generated by the meter indicative of a third electric potential generated by the sensor contacting the first calibration fluid and fourth information generated by the meter indicative of a fourth electric potential generated by the sensor contacting the second calibration fluid; and store third data indicative of an obstruction on the sensor in response to a difference between the first response slope and the second response slope being beyond a threshold.

CONCLUSION

Thus, in accordance with the presently disclosed inventive concept(s), there have been provided compositions and devices, as well as methods of producing and using same, which fully satisfy the objectives and advantages set forth hereinabove. Although the presently disclosed inventive concept(s) has been described in conjunction with the specific drawings, experimentation, results, and language set forth hereinabove, it is evident that many alternatives, modifications, and variations will be apparent to those skilled in the art. Accordingly, it is intended to embrace all such alternatives, modifications, and variations that fall within the spirit and broad scope of the presently disclosed inventive concept(s).

What is claimed is:

1. A fluid analyzer, comprising:
a fluid channel operable to carry fluids;
a sensor in fluidic communication with the fluid channel;
a meter operable to receive signals generated by the sensor and transform the signals into information indicative of an electric potential of the fluids;
a first calibration fluid having a first analyte concentration;
a second calibration fluid having a second analyte concentration different from the first analyte concentration;
one or more calibration fluid injection ports in fluidic communication with the fluid channel, the one or more calibration fluid injection ports being operable to receive a first calibration fluid and a second calibration fluid;
one or more valves positioned between the one or more calibration fluid injection ports and the sensor, the one or more valves being openable and closeable to provide one or more samples of each of the first calibration fluid and the second calibration fluid to the fluid channel; and
a control system having a processor operable to execute processor-executable code that when executed by the processor causes the processor to run an obstruction detection algorithm comprising:
at a first time period, controlling the one or more valves to successively pass the first calibration fluid and the second calibration fluid through the fluid channel to the sensor, and storing first data indicative of a first response slope based at least in part on a first difference between first information generated by the meter indicative of a first electric potential generated by the sensor contacting the first calibration fluid and second information indicative of a second electric potential generated by the sensor contacting the second calibration fluid;
at a second time period after the first time period, controlling the one or more valves to successively pass the first calibration fluid and the second calibration fluid through the fluid channel to the sensor, and storing second data indicative of a second response slope based at least in part on a second difference between third information indicative of a third electric potential generated by the sensor contacting the first calibration fluid and fourth information generated by the meter indicative of a fourth electric potential generated by the sensor contacting the second calibration fluid; and
storing third data indicative of an obstruction on the sensor in response to a difference between the first response slope and the second response slope being beyond a threshold.

2. The fluid analyzer of claim 1, wherein the sensor comprises a working electrode and a reference electrode.

3. The fluid analyzer of claim 2, wherein the working electrode is one of a chloride ion-selective electrode, a magnesium ion-selective electrode, a potassium ion-selective electrode, a sodium ion-selective electrode, a hydrogen ion-selective electrode, a bicarbonate ion-selective electrode, a calcium ion-selective electrode, and a blood urea nitrogen ion-selective electrode.

4. The fluid analyzer of claim 1, wherein the first response slope is based at least in part on a quotient having as a dividend a difference between the first information and the second information and having as a divisor a difference between a logarithm of the first analyte concentration and a logarithm of the second analyte concentration, and the second response slope is based at least in part on a quotient having as a dividend a difference between the third information and the fourth information and having as a divisor a difference between the logarithm of the first analyte concentration and the logarithm of the second analyte concentration.

5. The fluid analyzer of claim 1, wherein the one or more valves comprises a first calibration valve and a second calibration valve, the first calibration valve being openable and closeable to provide one or more samples of the first calibration fluid to the fluid channel, and
the second calibration valve being openable and closeable to provide one or more samples of the second calibration fluid to the fluid channel.

6. The fluid analyzer of claim 5, further comprising a wash fluid injection port in fluidic communication with the fluid channel and a wash fluid valve positioned between the wash fluid injection port and the sensor, the wash fluid injection port being operable to receive a wash fluid, and the wash fluid valve being openable and closeable to provide the wash fluid to the fluid channel.

7. The fluid analyzer of claim 6, wherein the processor-executable code when executed by the processor further causes the processor to control the wash fluid valve to pass the wash fluid through the fluid channel to the sensor based at least in part on the third data.

8. The fluid analyzer of claim 1, wherein the obstruction is a blood clot.

9. A method of detecting an obstruction on a sensor of a fluid analyzer, comprising:
  at a first time period, successively causing flow of a first calibration fluid and a second calibration fluid having known analyte concentrations to the sensor and determining a first response sensitivity of the sensor based at least in part on the known analyte concentrations and sensor responses of the sensor to the first calibration fluid and the second calibration fluid, wherein the known analyte concentration of the first calibration fluid and the known analyte concentration of the second calibration fluid are different;
  at a second time period, successively causing flow of the first calibration fluid and the second calibration fluid to the sensor and determining a second response sensitivity of the sensor based at least in part on the known analyte concentrations and the sensor responses of the sensor to the first calibration fluid and the second calibration fluid; and
  determining, by a processor, presence of the obstruction on the sensor based on at least in part on a difference between the first response sensitivity and the second response sensitivity.

10. The method of claim 9, wherein the step of determining the presence of the obstruction determines the presence of the obstruction when the difference is outside a predetermined threshold range.

11. The method of claim 9, wherein the step of determining the presence of the obstruction determines absence of the obstruction when the difference is inside a predetermined threshold range.

12. The method of claim 9, wherein the first response sensitivity is a first response slope of the sensor, the second response sensitivity is a second response slope of the sensor, and wherein the method further comprises a step of determining each of the first response slope and the second response slope by respectively dividing a difference between the sensor responses of the sensor to the first calibration fluid and the second calibration fluid by a difference between logarithms of the known analyte concentrations.

13. The method of claim 12, wherein:
  at the first time period, the step of successively causing the flow of the first calibration fluid and the second calibration fluid comprises:
    causing the first calibration fluid to contact the sensor to generate signals receivable and transformable by a meter into first information indicative of a first sensor response of the sensor responses, wherein the first sensor response is an electric potential generated by the sensor responsive to contacting the first calibration fluid;
    causing the second calibration fluid to contact the sensor to generate signals receivable and transformable by the meter into second information indicative of a second sensor response of the sensor responses, wherein the second sensor response is an electric potential generated by the sensor responsive to contacting the second calibration fluid; and
    storing first data indicative of the first response slope based at least in part on a difference between the first information and the second information; and
  wherein at the second time period after the first time period the step of successively causing the flow of the first calibration fluid and the second calibration fluid comprises:
    causing the first calibration fluid to contact the sensor to generate signals receivable and transformable by the meter into third information indicative of a third sensor response of the sensor responses, wherein the third sensor response is a third electric potential generated by the sensor responsive to contacting the first calibration fluid;
    causing the second calibration fluid to contact the sensor to generate signals receivable and transformable by the meter into fourth information indicative of a fourth sensor response of the sensor responses, wherein the fourth sensor response is a fourth electric potential generated by the sensor responsive to contacting the second calibration fluid;
    storing second data indicative of the second response slope based at least in part on a difference between the third information and the fourth information; and
    storing third data indicative of the presence of the obstruction on the sensor in response to a difference between the first response slope and the second response slope being beyond a threshold.

14. The method of claim 13, wherein the first response slope is based at least in part on a quotient having as a dividend the difference between the first information and the second information and having as a divisor a difference between logarithms of the known analyte concentrations, and the second response slope is based at least in part on a quotient having as a dividend the difference between the third information and the fourth information and having as a divisor the difference between the logarithms of the known analyte concentrations.

15. The method of claim 13, wherein the method further comprises a step of causing a wash fluid to contact the sensor based at least in part on the step of determining the presence of the obstruction.

16. The method of claim 13, wherein the method further comprises a step of storing the third data indicative of a blood clot on the sensor in response to the difference between the first response slope and the second response slope being beyond the threshold.

17. A fluid analyzer, comprising:
  a sensor configured to measure at least one parameter associated with a fluid;
  one or more containers configured to store a first calibration fluid and a second calibration fluid having known analyte concentrations, wherein the known analyte concentration of the first calibration fluid and the known analyte concentration of the second calibration fluid are different;
  one or more channels configured to provide fluid communication among the sensor and the one or more containers; and
  a processor configured to determine presence of an obstruction obstructing the sensor, wherein the processor is configured to:
    at a first time period, successively cause flow of the first calibration fluid and the second calibration fluid to the sensor and determine a first response sensitivity of the sensor based on at least in part on the known analyte concentrations and sensor responses of the sensor to the first calibration fluid and the second calibration fluid;
    at a second time period, successively cause flow of the first calibration fluid and the second calibration fluid to the sensor and determine a second response sensitivity of the sensor based at least in part on the known analyte concentrations and sensor responses of the sensor to the first calibration fluid and the second calibration fluid; and determine the presence of the obstruction based on at least in part on a difference between the first response sensitivity and the second response sensitivity.

18. The fluid analyzer of claim 17, wherein the processor is configured to determine the presence of the obstruction when the difference between the first response sensitivity and the second response sensitivity is outside a predetermined threshold range.

19. The fluid analyzer of claim 17, wherein the sensor comprises a working electrode and a reference electrode, the working electrode being one of a chloride ion-selective electrode, a magnesium ion-selective electrode, a potassium ion-selective electrode, a sodium ion-selective electrode, a hydrogen ion-selective electrode, a bicarbonate ion-selective electrode, a calcium ion-selective electrode, and a blood urea nitrogen ion-selective electrode.

20. The fluid analyzer of claim 17, wherein the first response sensitivity is a first response slope of the sensor, the second response sensitivity is a second response slope of the sensor, and wherein the processor is configured to determine each of the first response slope and the second response slope by respectively dividing a difference between the sensor responses of the sensor to the first calibration fluid and the second calibration fluid by a difference between logarithms of the known analyte concentrations.

21. The fluid analyzer of claim 17, further comprising a wash fluid injection port in fluidic communication with the one or more channels and a wash fluid valve positioned between the wash fluid injection port and the sensor, the wash fluid injection port being operable to receive a wash fluid, and the wash fluid valve being openable and closeable to provide the wash fluid to the one or more channels.

22. The fluid analyzer of claim 21, wherein the processor is further configured to control the wash fluid valve to pass the wash fluid through the one or more channels to the sensor in response to determining the presence of the obstruction.

23. The fluid analyzer of claim 17, wherein the obstruction is a blood clot.

24. A non-transitory computer readable medium storing an obstruction detection algorithm comprising processor-executable code that when executed by a processor causes the processor to:
at a first time period, control one or more valves to successively pass a first calibration fluid and a second calibration fluid having known analyte concentrations through a fluid channel to a sensor, wherein the known analyte concentration of the first calibration fluid and the known analyte concentration of the second calibration fluid are different, and store first data indicative of a first response slope based at least in part on a first difference between first information generated by a meter indicative of a first electric potential generated by the sensor contacting the first calibration fluid and second information generated by the meter indicative of a second electric potential generated by the sensor contacting the second calibration fluid;
at a second time period after the first time period, control the one or more valves to successively pass the first calibration fluid and the second calibration fluid through the fluid channel to the sensor, and store second data indicative of a second response slope based at least in part on a second difference between third information generated by the meter indicative of a third electric potential generated by the sensor contacting the first calibration fluid and fourth information generated by the meter indicative of a fourth electric potential generated by the sensor contacting the second calibration fluid; and
store third data indicative of an obstruction on the sensor in response to a difference between the first response slope and the second response slope being beyond a threshold.

* * * * *